(12) United States Patent
Donati et al.

(10) Patent No.: US 8,543,233 B2
(45) Date of Patent: Sep. 24, 2013

(54) INTEGRATED PACKAGING SYSTEM ARCHITECTURE

(75) Inventors: Claudio Donati, Modena (IT); Lorenzo Tacconi, Modena (IT); Fabio Zerri, Sant'Agata Bolognese (IT)

(73) Assignee: Tetra Laval Holdings & Finance S.A., Pully (CH)

( * ) Notice: Subject to any disclaimer, the term of this patent is extended or adjusted under 35 U.S.C. 154(b) by 448 days.

(21) Appl. No.: 12/744,194

(22) PCT Filed: Dec. 31, 2008

(86) PCT No.: PCT/EP2008/068382
§ 371 (c)(1),
(2), (4) Date: May 21, 2010

(87) PCT Pub. No.: WO2009/083595
PCT Pub. Date: Jul. 9, 2009

(65) Prior Publication Data
US 2010/0287879 A1    Nov. 18, 2010

(30) Foreign Application Priority Data
Dec. 31, 2007    (EP) .................................. 07425844

(51) Int. Cl.
*G06F 19/00* (2011.01)
(52) U.S. Cl.
USPC ............................................. 700/96; 700/117
(58) Field of Classification Search
USPC ........................ 700/95, 96, 99, 117
See application file for complete search history.

(56) References Cited

U.S. PATENT DOCUMENTS

| 4,827,423 | A | * | 5/1989 | Beasley et al. ................. 700/96 |
| 4,989,718 | A | | 2/1991 | Steeber |
| 5,406,772 | A | | 4/1995 | Dinius |
| 5,479,756 | A | | 1/1996 | Haze et al. |

(Continued)

FOREIGN PATENT DOCUMENTS

| EP | 0 414 487 A1 | 2/1991 |
| EP | 0 614 814 A1 | 9/1994 |

(Continued)

OTHER PUBLICATIONS

International Search Report issued by the European Patent Office on Mar. 31, 2009 as the International Searching Authority in International Application No. PCT/EP2008/068382.

(Continued)

*Primary Examiner* — Ryan Jarrett
(74) *Attorney, Agent, or Firm* — Buchanan, Ingersoll & Rooney PC

(57) ABSTRACT

A packaging system includes a packaging line comprising a filling machine for producing sealed packages containing food product and downstream distribution equipment connected by conveyors and each including a control system, a line controller for managing configuration, communication and control of the packaging line, a common overhead message display which displays visual information on the operation of the equipment, and a communication network for connecting the line controller to the equipment. The line controller includes a line configurator which reduces and secures effective line installation, start up and tuning at the manufacturing floor via "plug and play", a line commander which optimizes line performance and product flows during production, a recipe manager which accommodates production flexibility by improving "easy to use" line resources and material, and a conveyor optimizer which optimizes product transportation along the conveyors.

23 Claims, 28 Drawing Sheets

(56) References Cited

U.S. PATENT DOCUMENTS

| | | |
|---|---|---|
| 6,535,786 B1 | 3/2003 | Duemler |
| 6,834,370 B1 * | 12/2004 | Brandl et al. .................. 715/201 |
| 7,814,939 B2 * | 10/2010 | Bernhard .......................... 141/1 |
| 2003/0139936 A1 | 7/2003 | Saucier et al. |
| 2006/0074505 A1 | 4/2006 | Kline, Jr. |
| 2006/0080827 A1 | 4/2006 | Saito et al. |
| 2006/0231295 A1 | 10/2006 | Yamaguchi et al. |
| 2008/0097636 A1 | 4/2008 | Kline, Jr. |
| 2011/0035037 A1 * | 2/2011 | Weber et al. ..................... 700/96 |

FOREIGN PATENT DOCUMENTS

| | | |
|---|---|---|
| EP | 1 640 835 A1 | 3/2006 |
| EP | 1 695 913 A2 | 8/2006 |
| JP | 2006-293922 A | 10/2006 |
| RU | 63792 U1 | 10/2007 |
| WO | WO 99/41169 A1 | 8/1999 |
| WO | 01/19677 A2 | 3/2001 |
| WO | WO 03/064298 A1 | 8/2003 |
| WO | WO 03/073196 A2 | 9/2003 |

OTHER PUBLICATIONS

Written Opinion issued by the European Patent Office on Mar. 31, 2009 as the International Searching Authority in International Application No. PCT/JP2008/068382.

Russian Office Action issued Jan. 22, 2013 by the Russian Patent Office in Russian Patent Application No. 2010132245/08(045601) and its English language translation (8 pgs).

Japanese Office Action issued Mar. 12, 2013 by the Japanese Patent Office in Japanese Patent Application No. 2010-540147 and its English language translation (3 pgs).

* cited by examiner

Line Recipe Red

Line Recipe Green

INTEGRATED PACKAGING SYSTEM ARCHITECTURE

TECHNICAL FIELD OF THE INVENTION

The present invention relates in general to food packaging, and in particular to continuous sealed packaging of pourable food products.

BACKGROUND ART

As is known, on a factory floor of a food packaging plant, several specifically-aimed processes are generally performed, including incoming food and packaging material storage, food processing, food packaging, and package warehousing. With specific reference to pourable food products, food packaging is performed in Packaging Lines, each of which is an assembly of machines and equipments for the production and handling of packages, and includes a Filling Machine for the production of the packages, followed by one or more defined configurations of downstream Distribution Equipments such as, accumulators, straw applicators, film wrappers; and cardboard packers, connected to the Filling Machine via Conveyors, for the handling of the packages.

A typical example of this type of packages is the parallelepiped-shaped package for liquid or pourable food products known as Tetra Brik Aseptic®, which is made by folding and sealing a laminated web of packaging material.

The packaging material has a multilayer sheet structure substantially comprising one or more stiffening and strengthening base layers typically made of a fibrous material, e.g. paper, or mineral-filled polypropylene material, covered on both sides with a number of heat-seal plastic material layers, e.g. polyethylene film. In the case of aseptic packages for long-storage products, such as UHT milk, the packaging material also comprises a gas- and light-barrier material layer, e.g. aluminium foil or ethyl vinyl alcohol (EVOH) film, which is superimposed on a heat-seal plastic material layer, and is in turn covered with another heat-seal plastic material layer forming the inner face of the package eventually contacting the food product.

Packages of this sort are produced on fully automatic Filling Machines, wherein a continuous vertical tube is formed from the web-fed packaging material; which is sterilized by applying a chemical sterilizing agent such as a hydrogen peroxide solution, which, once sterilization is completed, is removed, e.g. evaporated by heating, from the surfaces of the packaging material; and the sterilized web is maintained in a closed, sterile environment, and is folded and sealed longitudinally to form the vertical tube. The tube is then filled downwards with the sterilized or sterile-processed pourable food product, and is fed along a vertical path to a forming station, where it is gripped along equally spaced cross sections by two pairs of jaws, which act cyclically and successively on the tube, and seal the packaging material of tube to form a continuous strip of pillow packs connected to one another by transverse sealing strips. Pillow packs are separated from one another by cutting the relative sealing strips, and are conveyed to a final folding station where they are folded mechanically into the finished, e.g. substantially parallelepiped-shaped, packages.

Alternatively, the packaging material may be cut into blanks, which are formed into packages on forming spindles, and the packages are filled with food product and sealed. One example of this type of package is the so-called "gable-top" package known as Tetra Rex®.

Existing, first-generation Packaging Lines generally have a decentralized control, poor or even no configuration flexibility, and different communication channels and automation solutions and hardware, and generally require customization of the line automation software in the Filling Machine and each Distribution Equipment.

Therefore, existing Packaging Line automation and control systems cannot provide the flexibility and functionality features required to satisfy the ever-increasing market demand for food safety and traceability, and for higher production versatility.

However, despite their age, many legacy automation and control systems continue to provide valuable functionality that warrants their upgrade, represent a huge capital investment that production management want to prolong.

An ever-increasing need is hence felt for a packaging plant automation evolution, in particular for new generation Packaging Lines featuring integrated solutions such as centralized and robust automation control, increased configuration flexibility, same communication channels and automation solutions and hardware, and no need for customization of the line automation software in the Filling Machines and Distribution Equipments.

OBJECT AND SUMMARY OF THE INVENTION

The objective of present invention is to provide a new generation Packaging Line which meets the aforementioned need.

This objective is achieved by the present invention in that it relates to a Packaging System, as defined in the appended claims.

BRIEF DESCRIPTION OF THE DRAWINGS

For a better understanding of the present invention, preferred embodiments, which are intended purely by way of example and are not to be construed as limiting, will now be described with reference to the attached drawings (all not to scale), wherein.

DETAILED DESCRIPTION OF PREFERRED EMBODIMENTS OF THE INVENTION

The following discussion is presented to enable a person skilled in the art to make and use the invention. Various modifications to the embodiments will be readily apparent to those skilled in the art, without departing from the scope of the present invention as claimed. Thus, the present invention is not intended to be limited to the embodiments shown, but is to be accorded the widest scope consistent with the principles and features disclosed herein and defined in the appended claims.

Figure 1:
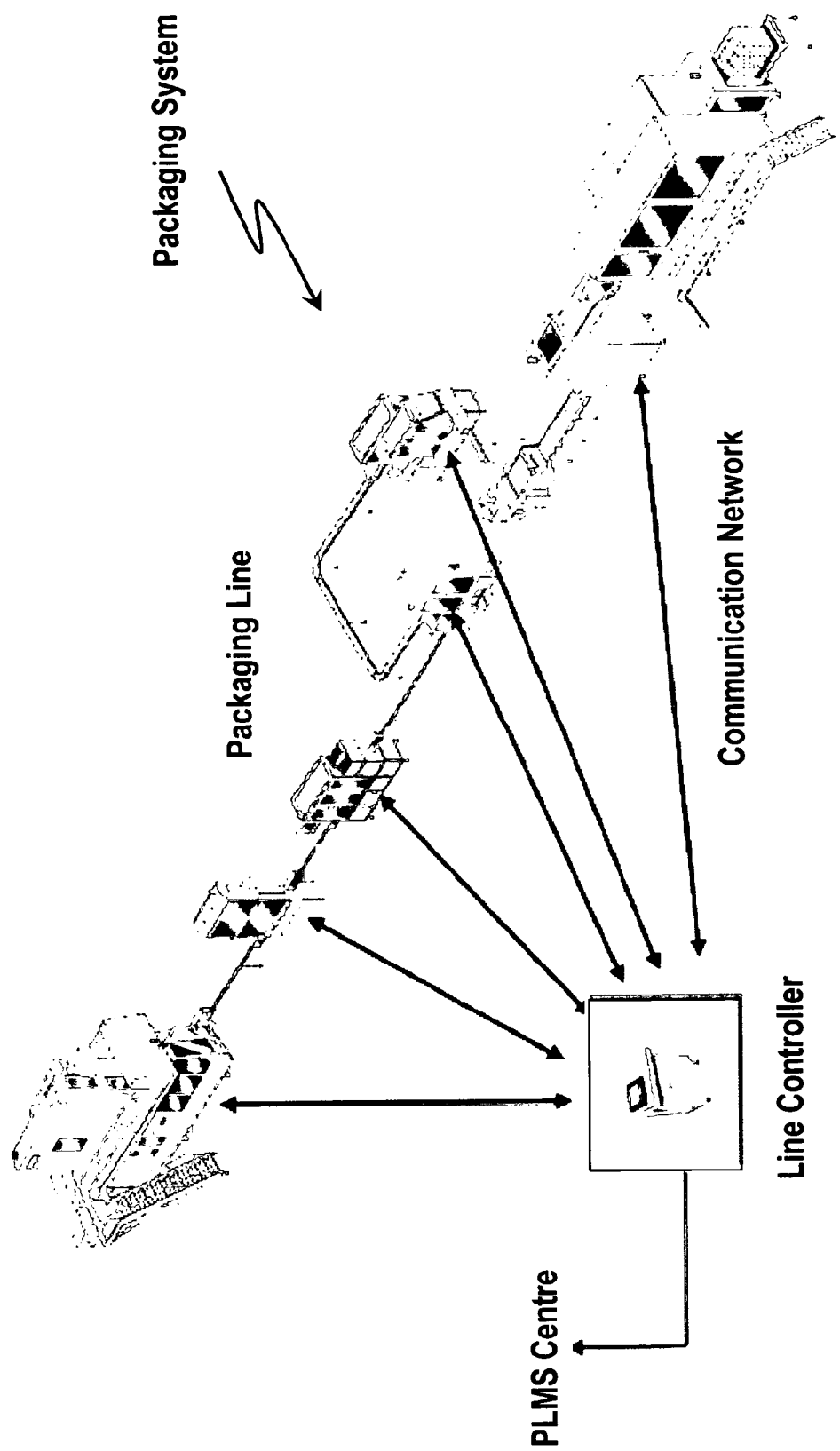
FIG. 1 shows schematically an integrated Packaging System according to a first embodiment of the present invention.

FIG. 1 shows a schematic layout of an integrated Single-Line Packaging System (PS) according to an embodiment of the present invention. The Packaging System includes:

- a Packaging Line (PL) including a Filling Machine or Equipment (FM) followed by one or more defined configurations of downstream Distribution Equipments (DE) such as, Accumulators, Straw Applicators, Cap Applicators, Handle Applicators, Cardboard Packers, Film Wrappers, Configuration Switches, Dynamic Switches, and Pallet Systems, which are cascade connected to each other or to the Filling Machine (FM) via Conveyors (C), which are all known per se and hence will not be described in detail. In particular, the Filling Machine is operable to selectively produce one or different types of sealed packages, which contain one or different food products introduced in the packages by pouring, and which are made of a multilayer sheet (laminated) packaging material including at least one stiffening and strengthening base layer and one or more heat-seal plastic layers, and each Distribution Equipment is operable to carry out a corresponding packaging operation on incoming individual or groups of sealed packages;
- a Line Controller (LC) designed and programmed to manage configuration, communication and control of the Packaging Line with the aim of optimizing the interaction between the Filling Machine and the Distribution Equipments to improve the Packaging Line performance and product transportation during production;
- a Packaging Line Monitoring System (PLMS) Centre designed and programmed to cooperate with Line Controller to measure, analyze, and optimize the operational performance of the Packaging Line;
- a common overhead Message Display designed to provide a basic visual information on the operation of the Filling Machine and Distribution Equipments, such as production information, equipment stop, material request, line phase, etc.; and
- a common Communication Channel Infrastructure comprising a switch-based Ethernet Network with e.g. a star-topology, and designed to connect the Line Controller to the Filling Machine, the Distribution Equipments, and the Message Display; a Ethernet Network designed to connect the Line Controller to the PLMS Centre; a Fiedlbus, e.g. DeviceNet, network designed to connect the Line Controller to the Conveyors, a digital I/O designed to connect the Line Controller to a Conveyor Lubricating Unit; and a safety bus designed to provide a safety serial communication between zone-based safety PLCs in the Line Controller, the Filling Machine, the Distribution Equipments, and the Conveyors, to allow an easier fulfilment of the legal requirements in Integrated Manufacturing Systems (e.g.: ISO 11161, Packaging line CE marking at customer site).

Figure 2:
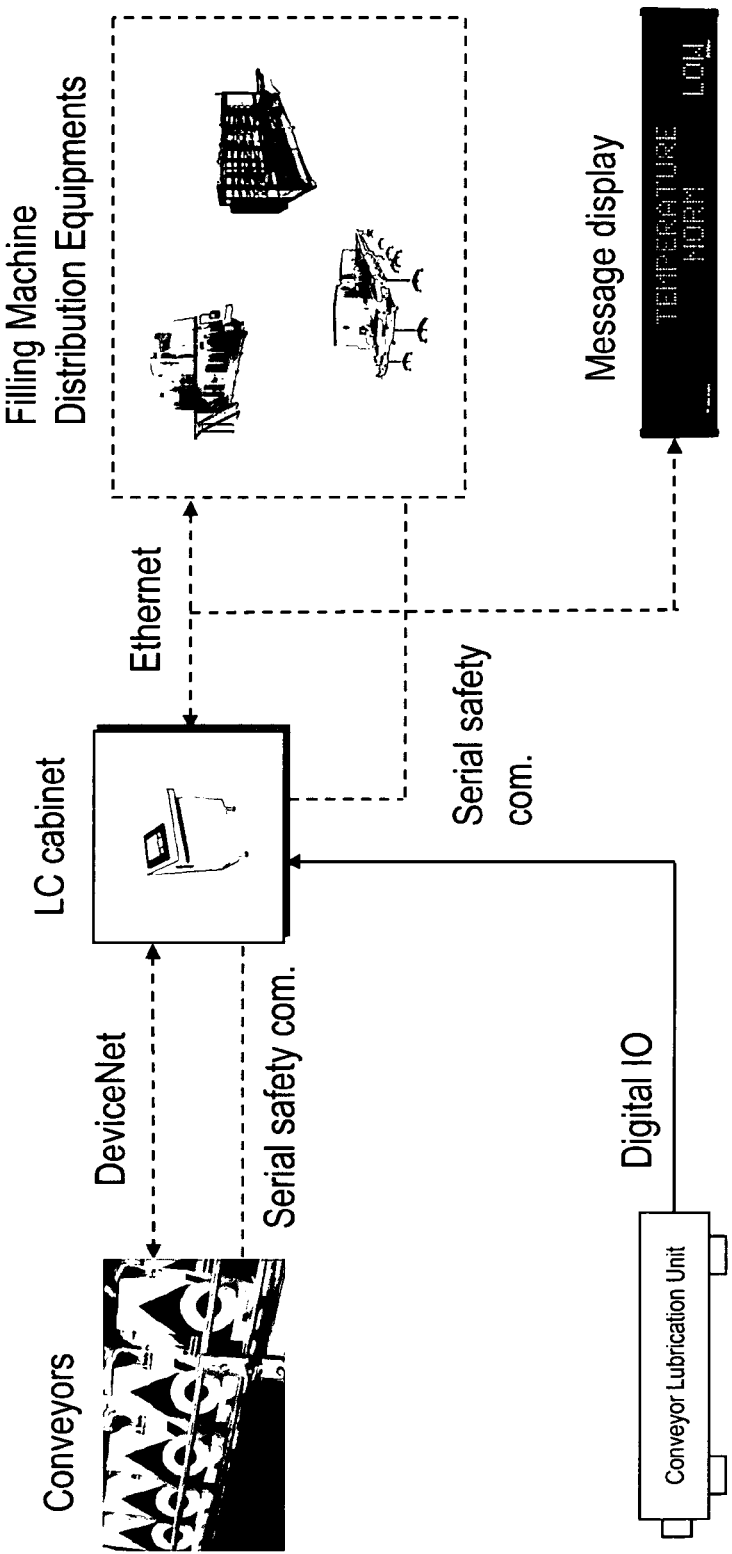
FIG. 2 shows a block diagram depicting the general architecture of the Packaging System of FIG. 1.
Figure 3:
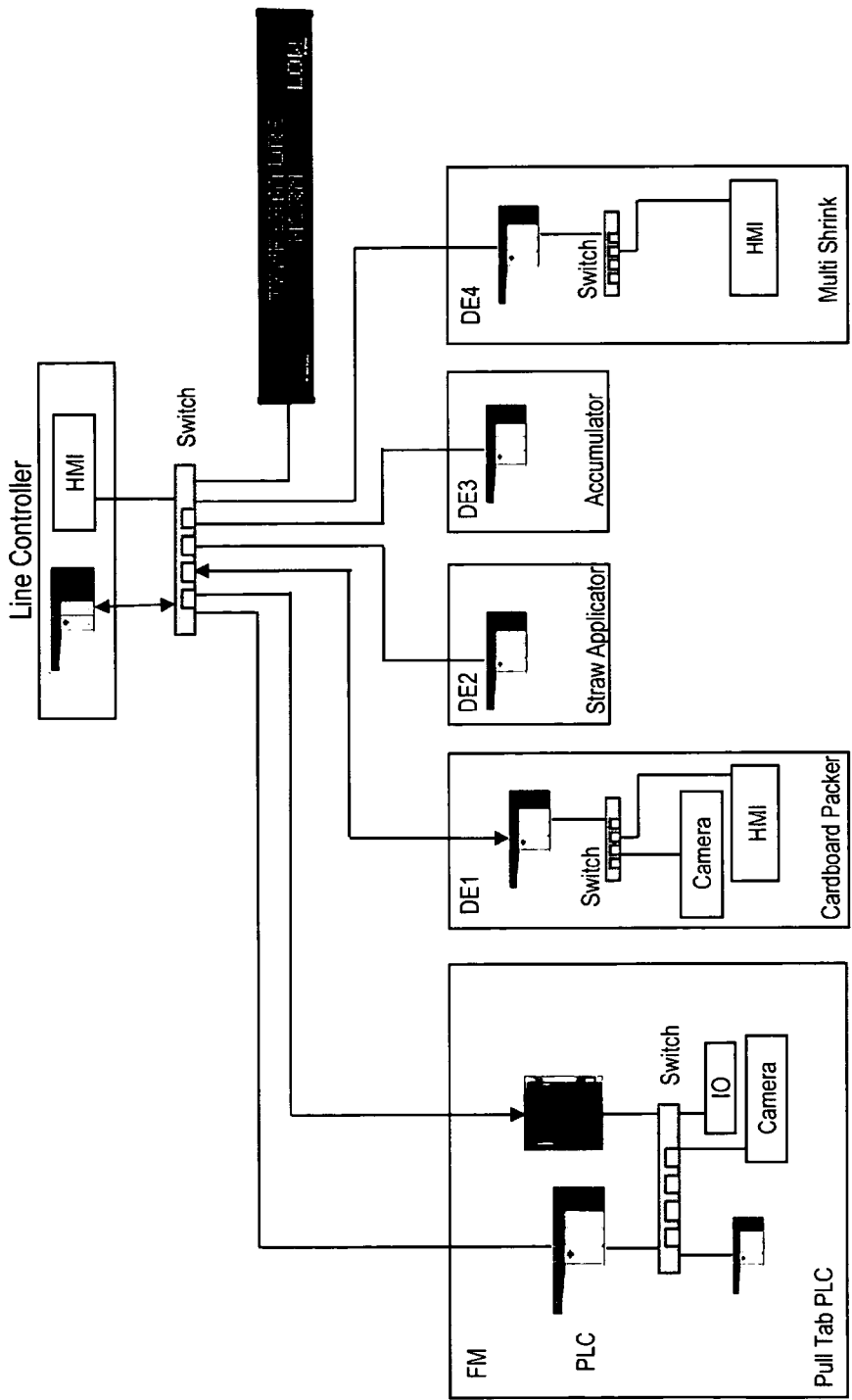
FIG. 3 shows a block diagram depicting the general topology of an Ethernet Network of the Packaging System of FIG. 1.

FIG. 2 shows schematically the general architecture of the Packaging System, while FIG. 3 shows schematically the general topology of the Ethernet Network, wherein same reference numerals as those in FIG. 1 reference the same elements.

Figure 4:
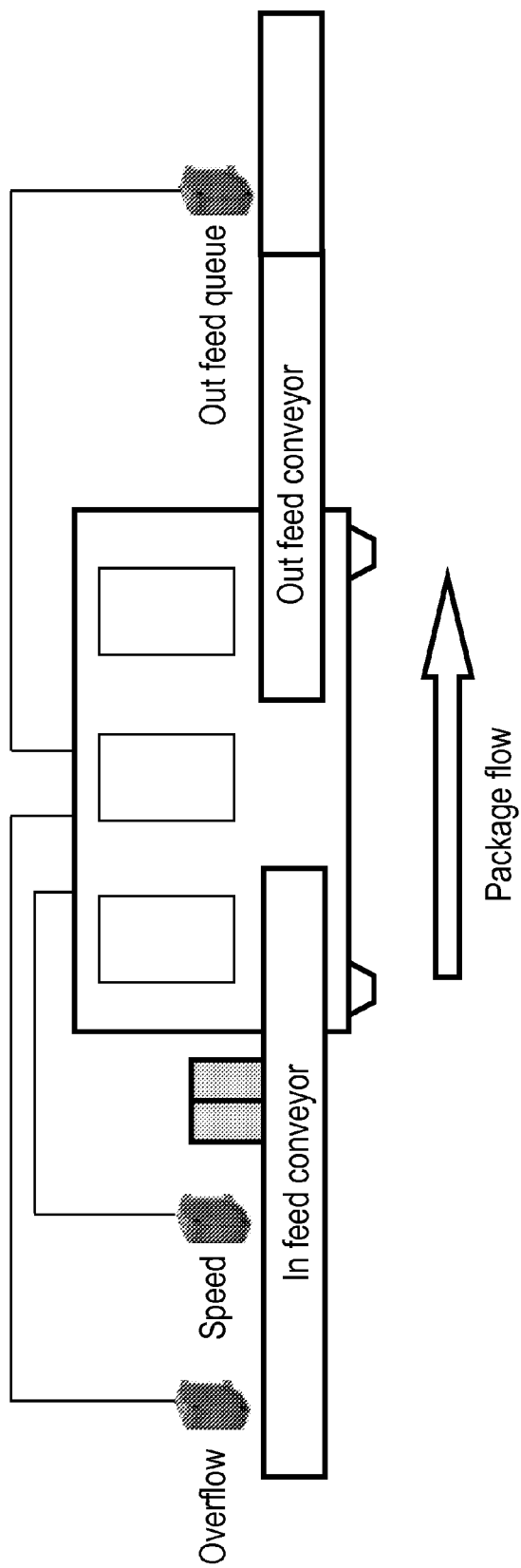
FIG. 4 shows schematically a layout of a Distribution Equipment of the Packaging System of FIG. 1.

FIG. 4 shows schematically a Distribution Equipment, which is equipped with an in-feed Conveyor provided with a queue resistor-based photocell sensor (overflow sensor) and a counting resistor-based photocell sensor (speed sensor), an out-feed Conveyor provided with a queue resistor-based photocell sensor, and a local Programmable Logic Controller (PLC) designed to store and execute local control software modules configured to individually control the in-feed and out-feed Conveyors and to provide a homogeneous and standard interface.

Each Conveyor in the Packaging Line (other than the in-feed and out-feed Conveyors of the Distribution Equipments, and hence not to be mistaken for the latter) may be of a bypass type, a switch type, and a transporter type, and the latter may in turn be of an accumulation type or a simple start/stop type. Each Conveyor is directly electronically controlled by the Line Controller and is provided with a Conveyor Manager based on an automation distribute concept and the Fieldbus technology, a Conveyor Motor equipped with a Frequency Converter Unit and I/O unit remote, and a power distribution (380V and 24V) based on a daisy-chain topology.

A Configuration Switch defines the package flow path in a static way, so that the Packaging Line assumes the same configuration during the same production batch, also called Line Recipe, as described in more detail hereinafter. In particular, the position of a Configuration Switch is defined manually or automatically during the initial configuration of the Packaging Line corresponding to a selected Line Recipe, and remains the same during all the production phase.

A Dynamic Switch defines the package flow path in a dynamic way, so that the Packaging Line may assume different configurations during the same production batch. In particular, a Dynamic Switch can be manually or automatically operated to change its operating position during a production phase, but it is not a device to continuously control the flow during the production. For example, a Dynamic Switch may be used to redirect the package flow to a back-up Distribution Equipment, in order to avoid a congestion of the Packaging Line.

Figure 5:
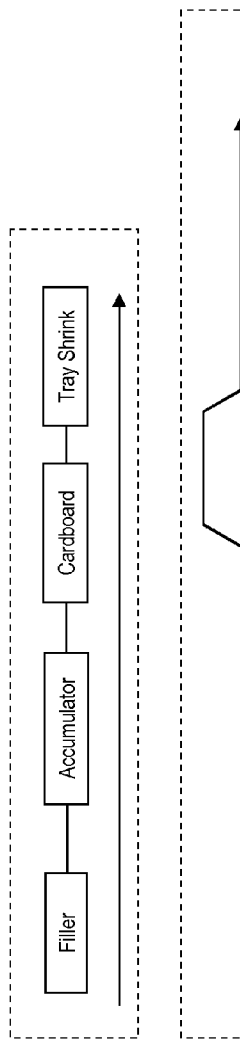
FIGS. 5 to 8 show block diagrams depicting different schematic layouts of an integrated Packaging System according to the first embodiment of the present invention.
Figure 6:
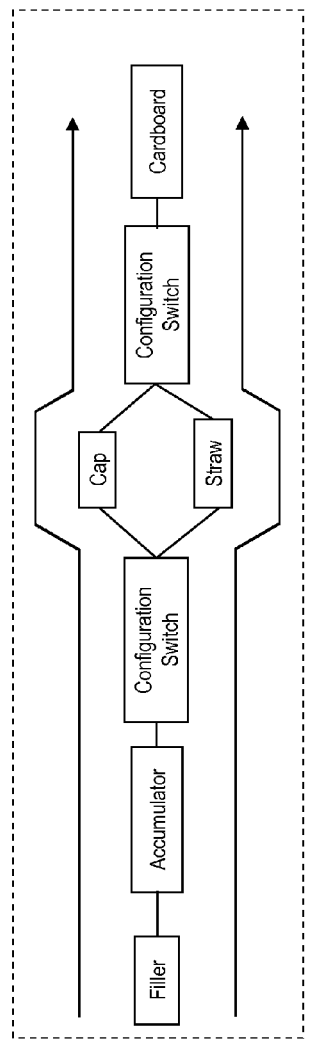
Figure 7:
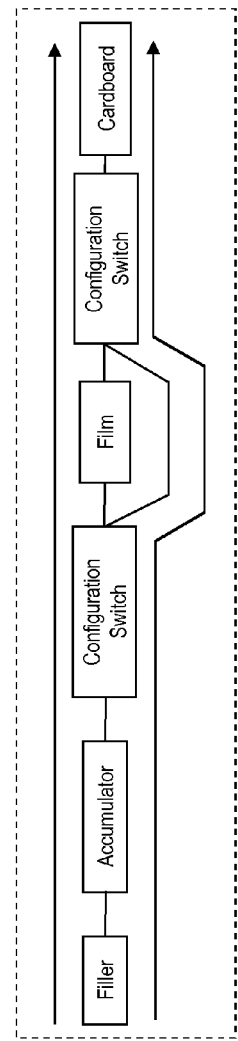
Figure 8:
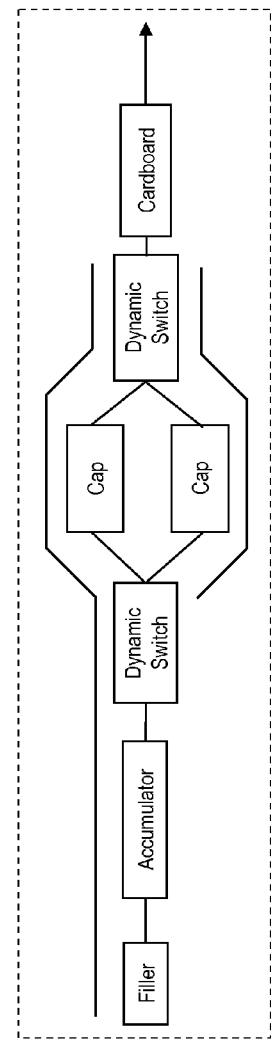

FIGS. 5 to 8 show four different examples of Packaging Lines. In particular, FIG. 5 shows a straight Packaging Line including, in order, a Filling Machine, an Accumulator, a Cardboard Packer, and a Cardboard Tray Wrapper. FIG. 6 shows a Packaging Line including, in order, a Filling Machine, an Accumulator, a first Configuration Switch, a Cap Applicator and a Straw Applicator which are operatively arranged in parallel and are selectively operable, a second Configuration Switch, and a Cardboard Packer, wherein the two Configuration Switches allow two different paths, and hence two different package flows, to be alternatively selected, one including the Cap Applicator and the other including the Straw Applicator, which Applicators cannot work together. FIG. 7 shows a Packaging Line including, in order, a Filling Machine an Accumulator, a first Configuration Switch, a Film Wrapper and a By-pass Conveyor which are operatively arranged in parallel, a second Configuration Switch, and a Cardboard Packer, wherein the two Configuration Switches allow the Film Wrapper to be by-passed, thus selectively providing two different paths, and hence two different package flows, one including the Film Wrapper and the other not including the Film Wrapper. FIG. 8 shows a Packaging Line including, in order, a Filling Machine, an Accumulator, a first Dynamic Switch, a first Cap Applicator and a second Cap Applicator operatively arranged in parallel, a second Dynamic Switch, and a Cardboard Packer, wherein the two Dynamic Switches allow the two Cap Applicators to be simultaneously used, thus providing a single package flow.

The Line Controller includes a stand-alone console or cabinet equipped with a Human-Machine Interface (HMI) made up of a display panel and a keyboard, and a PLC-based control system designed to store and execute modular-architecture software applications or tools configured to cooperate with the local software modules in the Filling Machine and the Distribution Equipments via a standard communication to control and supervise operation of the Packaging Line. The modular-architecture software and the standard interface allow different Packaging Line complexities (different layout and variety of Filling Machines and Distribution Equipments) to be managed without any customization in the software of the single equipment. Compared to the previous generation of Packaging Lines, this allows a standard software in the Filling Machines and Distribution Equipments to be maintained and all the customized parameters to be collected in the Line Controller. The advantage of that is a high level of standardization in the Filling Machines and Distribution Equipments and hence an easy maintenance of them. For the purpose of the present invention, by the expression "software applications" it is intended a defined subclass of computer software that employs the capabilities of a computer directly to a task that the user wishes to perform.

Figure 9:
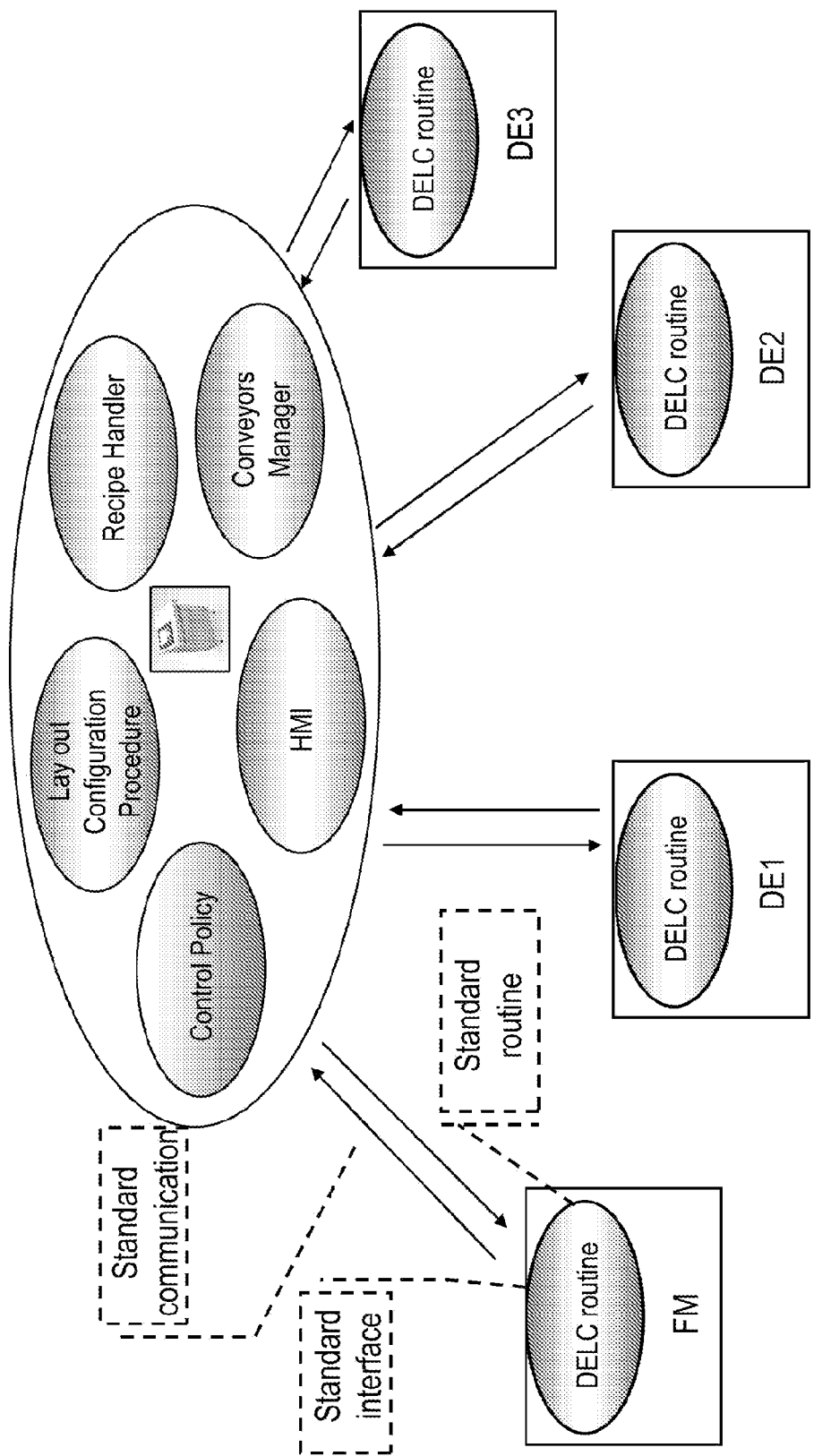
FIG. 9 shows a block diagram depicting the modular architecture of the software in the Packaging Line.

FIG. 9 shows a block diagram depicting the modular-architecture software in the Line Controller and in the Filling Machine and Distribution Equipments.

In detail, the software applications in the Line Controller include:
- a Line Configurator, which is a supportive "plug and play" tool designed to reduce and secure effective Packaging Line installation, start up and tuning at the manufacturing floor;
- a Line Commander, which is a master controller tool designed to optimize Packaging Line performance and product flows during production;
- a Recipe Manager, which is a management tool designed to accommodate production flexibility by improving "easy to use" Packaging Line resources and material; and
- a Conveyor Optimizer, which is a tool designed to optimize product transportation along the Conveyors.

The Line Configurator is a software application designed to provide a Graphical User Interface (GUI) which allows four different configuration functionality to be selected/implemented by an operator or specialized technician, namely:
  Machine Detection,
  Layout Configuration,
  Layout Association, and
  Line Settings.

All these functionalities enable a "plug and play" mechanism and a flexible parameterization of the Packaging Line during the start-up phase with the reduction of the configuration and tuning time.

FIGS. 10 to 16 show examples of configuration windows of the Graphical User Interface during the configuration of the Packaging Line and related to the aforementioned Machine Detection, Layout Configuration, and Layout Association functions.

All configuration windows display, in their bottom areas, a plurality of soft keys which are arranged side by side and include, in order, a soft key related to language and password settings, a soft key related to alarm settings, a soft key related to settings which are allowed to a generic operator, a soft key related to settings which are allowed to a specialized technician only, a soft key related to the above-described Recipe Manager, a soft key related to the above-described Line Configurator, and a navigation soft key to allow an operator to move through the configuration windows.

Figure 10:
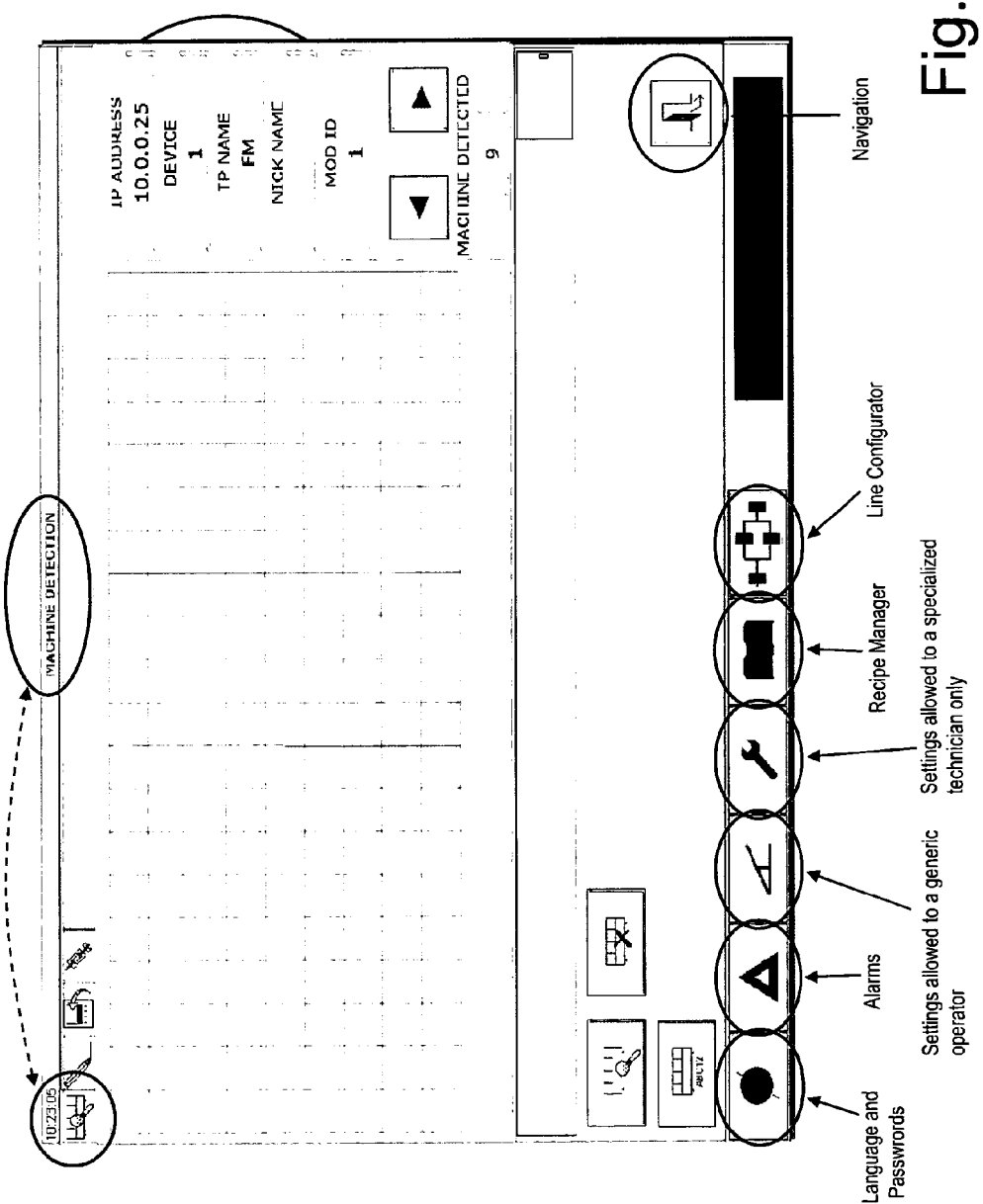
FIGS. 10 to 16 show different configuration windows of a Graphical User Interface during the configuration of the Packaging Line.

FIG. 10 shows the configuration window related to the Machine Detection functionality. When the operator clicks on a Machine Detection soft key displayed on the top, right corner of the Graphical User Interface, the Line Configurator automatically detects and identifies the Filling Machine, the Distribution Equipments and the Conveyors in the Packaging Line, and upload the production capabilities thereof. To do so, the Line Configurator sends an identification request to the Filling Machine and the Distribution Equipments in the Packaging Line, which reply by sending to the Line Controller their addresses in the common communication network. Based on that, the Line Configurator probes for identity and production information of the Filling Machine and the Distribution Equipments, which send back their ID card messages. The example shown in FIG. 10 relates to the detection of a Filling Machine (FM) with IP address 10.0.0.25.

Figure 11:
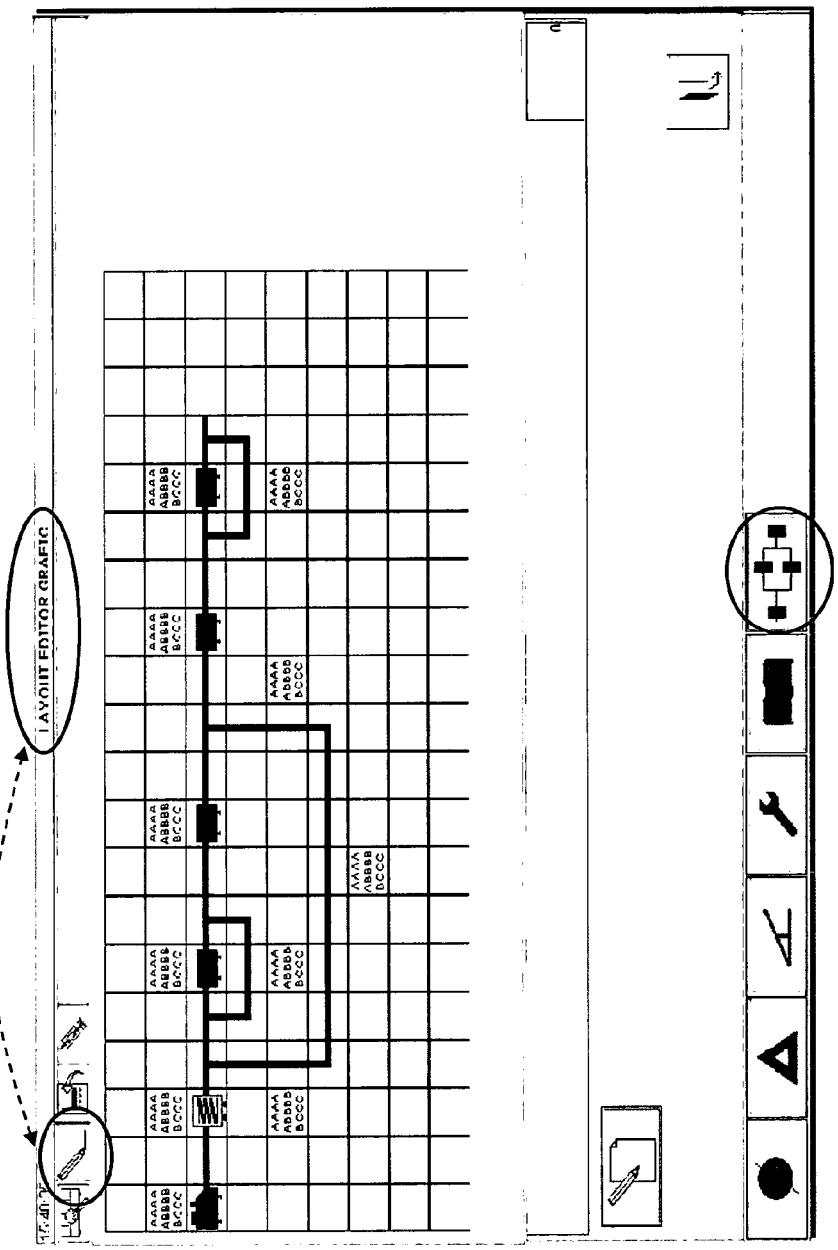

When the Filling Machine, the Distribution Equipments and the Conveyors in the Packaging Line have been detected and identified, and the operating parameters thereof uploaded, the operator is allowed to click on a Layout Configuration soft key to graphically build a Packaging Line layout. FIG. 11 shows the configuration window related to the Layout Configuration functionality. In particular, when the operator clicks on a Layout Configuration soft key displayed on the top, right corner of the Graphical User Interface, a layout graphical editor is provided which allows the operator to graphically create the Packaging Line layout by drawing on the display of the Line Controller the Filling Machine and the individual Distribution Equipments and Conveyors, and to set the production/operating parameters thereof. In particular, the Graphical User Interface is designed to provide a display area which is divided into matrix-arranged, square-shaped display pixels, and the graphical drawing of the Packaging Line layout may be made by the operator simply clicking repeatedly on a display pixel to sequentially display the graphical representations of different types of Filling Machines, Distribution Equipments, and Conveyors, the production/operating capabilities each of which are stored in an appropriate database.

Figure 12:
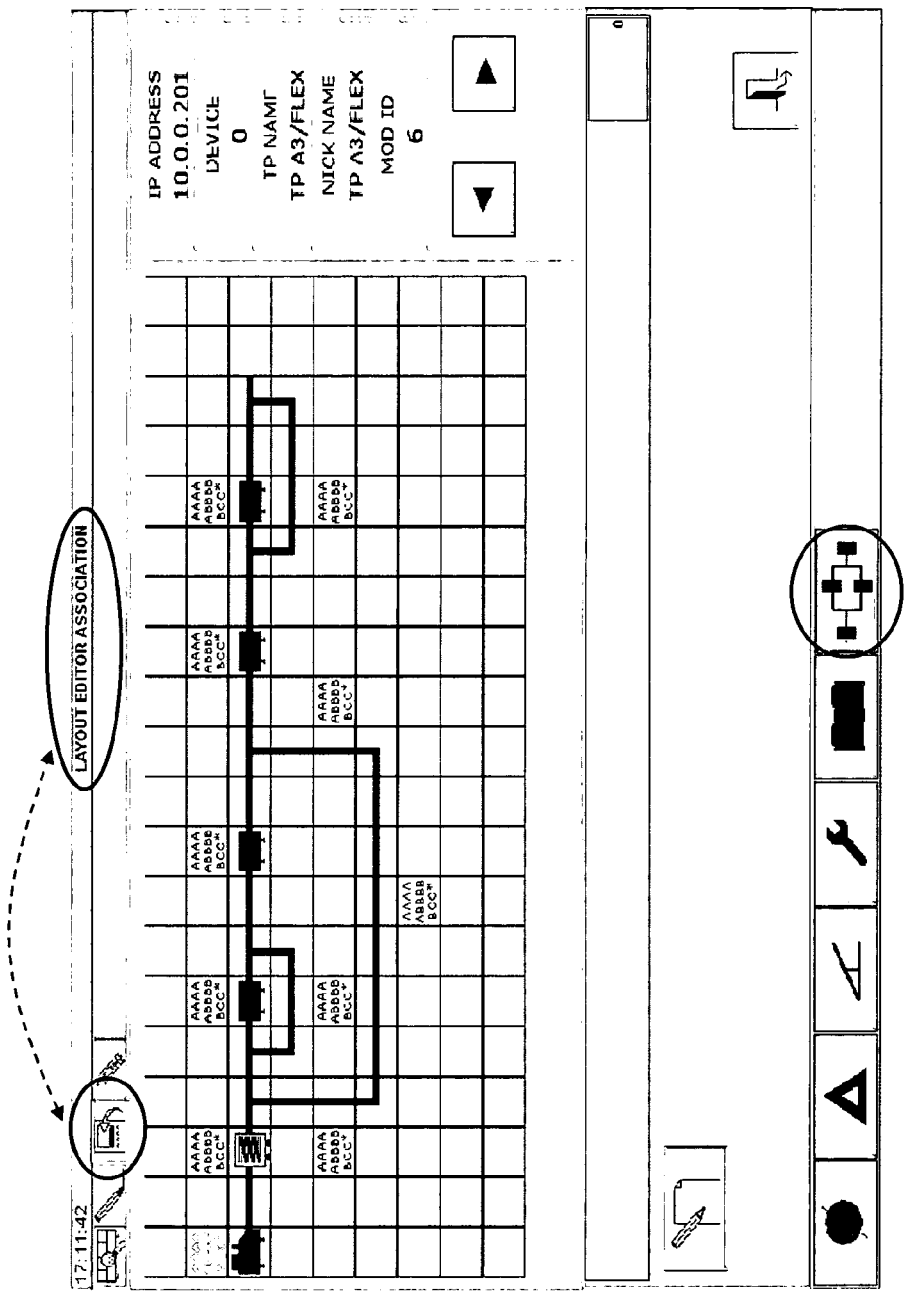

Once the Packaging Line layout has been entirely graphically drawn, the operator is allowed to click on a Layout Association soft key to associate the graphical representations of the Filling Machine, Distribution Equipment(s), and Conveyor(s) with the identified Filling Machine, Distribution Equipment(s), and Conveyor(s) in the real Packaging Line. FIG. 12 shows the configuration window related to the Layout Association functionality. In particular, when the operator clicks on a Layout Association soft key displayed on the top, right corner of the Graphical User Interface, the operator is allowed to graphically select one by one the graphical representations of the Filling Machine, Distribution Equipments, and Conveyors, and to associate the selected graphical representation with an identified Filling Machine, Distribution Equipment, and Conveyor. The association of the graphical representation of a Filling Machine, Distribution Equipment, and Conveyor displayed in the selected pixel(s) with a detected Filling Machine, Distribution Equipment, and Conveyor includes a match check to prevent a wrong association or an association with a Filling Machine, Distribution Equipment or Conveyor that is not actually present in the real Packaging Line which is to be configured. The example shown in FIG. 12 relates to the association of two selected pixels, shown with a white background, with a TP A3/FLEX Filling Machine.

Once all the graphical representations of the Filling Machine, Distribution Equipments, and Conveyors have been associated with a corresponding identified Filling Machine, Distribution Equipment, and Conveyor, and after a Line Recipe has been created by a specialized technician, as described in detail hereinafter with reference to FIGS. 22 to 26 relating to the Recipe Manager, the Packaging Line may be configured by the specialized technician by clicking on a Line Settings soft key displayed on the bottom area of the Graphical User Interface. FIGS. 13 to 16 show the configuration windows related to the Line Settings function. In particular, when the specialized technician clicks on the Line Settings soft key, the Graphical User Interface allows three different configuration functions to be selected and implemented, namely:

Line Tuning;
Filling Machine Mode; and
Accumulation mode.

Figure 13:
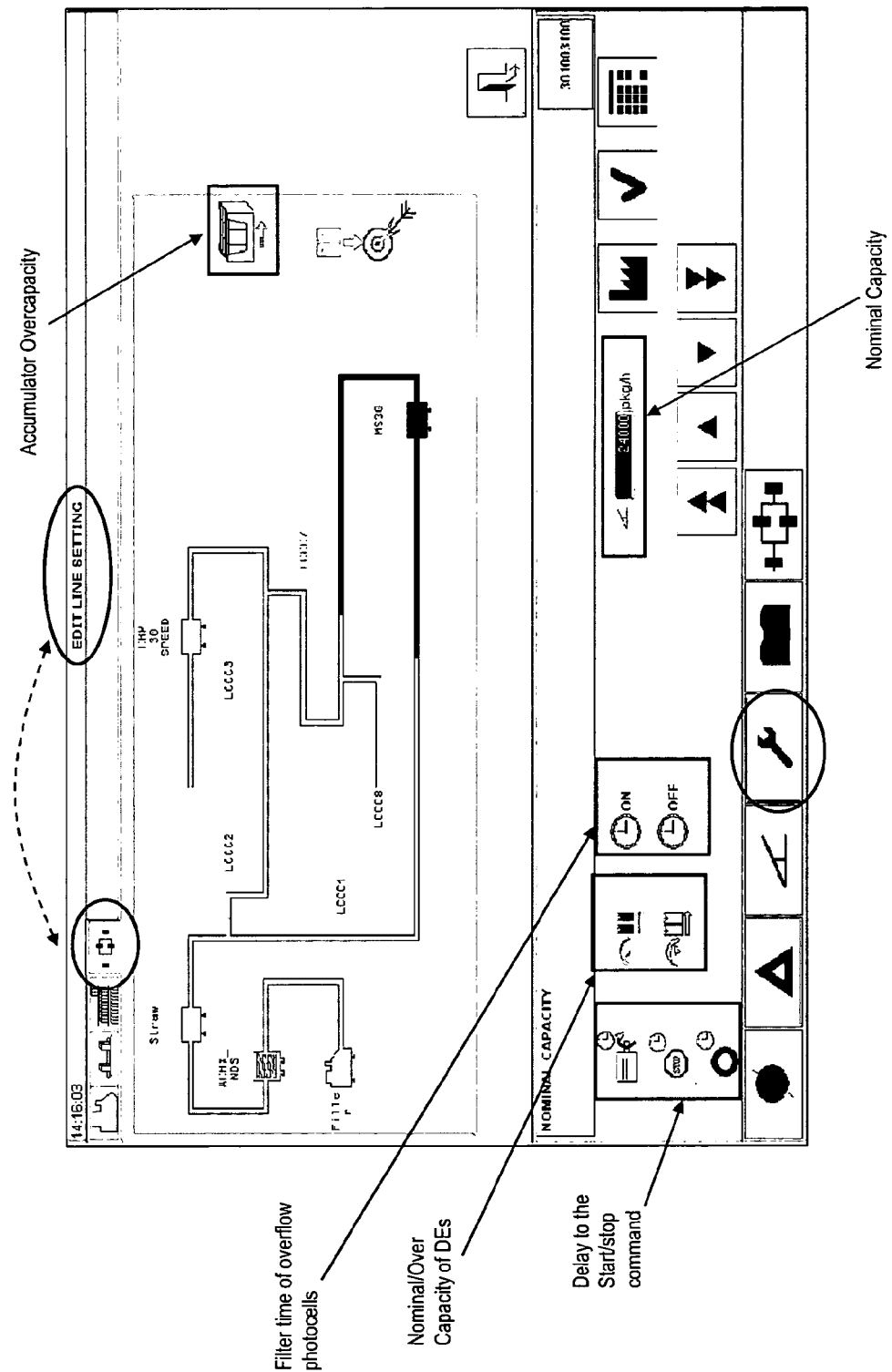
Figure 14:
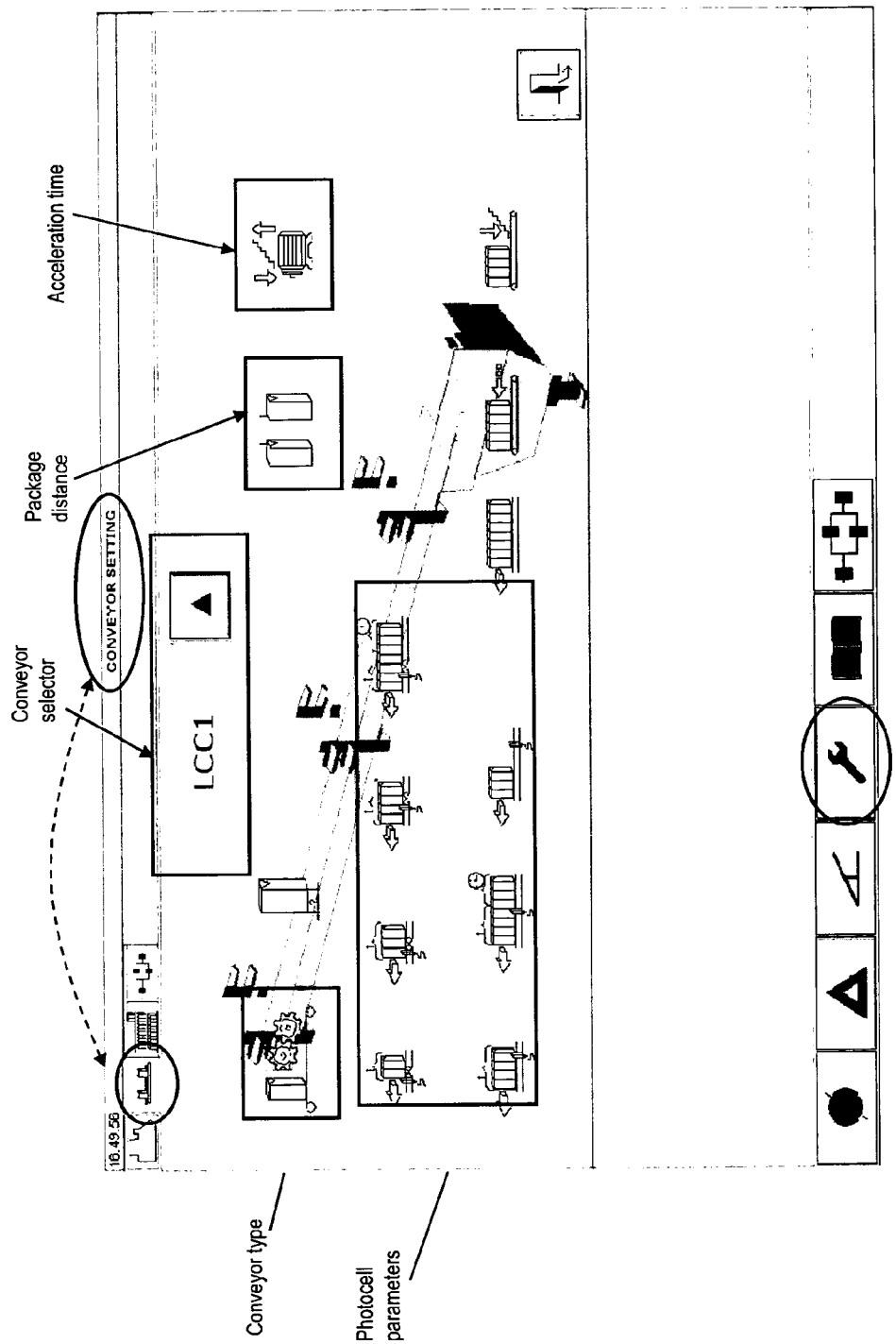

In particular, FIGS. 13 and 14 show the configuration windows related to the Line Tuning function. When the specialized technician clicks on the Line Tuning soft key, the Graphical User Interface allows the operator to select the active Filling Machines, Distribution Equipments and Conveyors, and the production path that fits with the production batch, and to on-line set up or change different automation parameters and configuration of the Packaging Line to be used during the start-up and production phases to optimize Packaging Line behavior. All the tuning and automation parameters are stored in a compact flash memory card, and are loaded when a Line Recipe is selected, as will be described in detail hereinafter. The examples shown in FIGS. 13 and 14 relate to the setting of general parameters of the Packaging Line, such as the nominal capacity and the overcapacity of the Distribution Equipments, the filter time of the overflow photocell sensors, the delay to the Start/Stop commands, etc., and, respectively, to the setting of specific parameters of each individual Conveyor in the Packaging Line, such as the Conveyor type, the parameters of the photocell sensors, the package distance, the acceleration time, etc.

Figure 15:
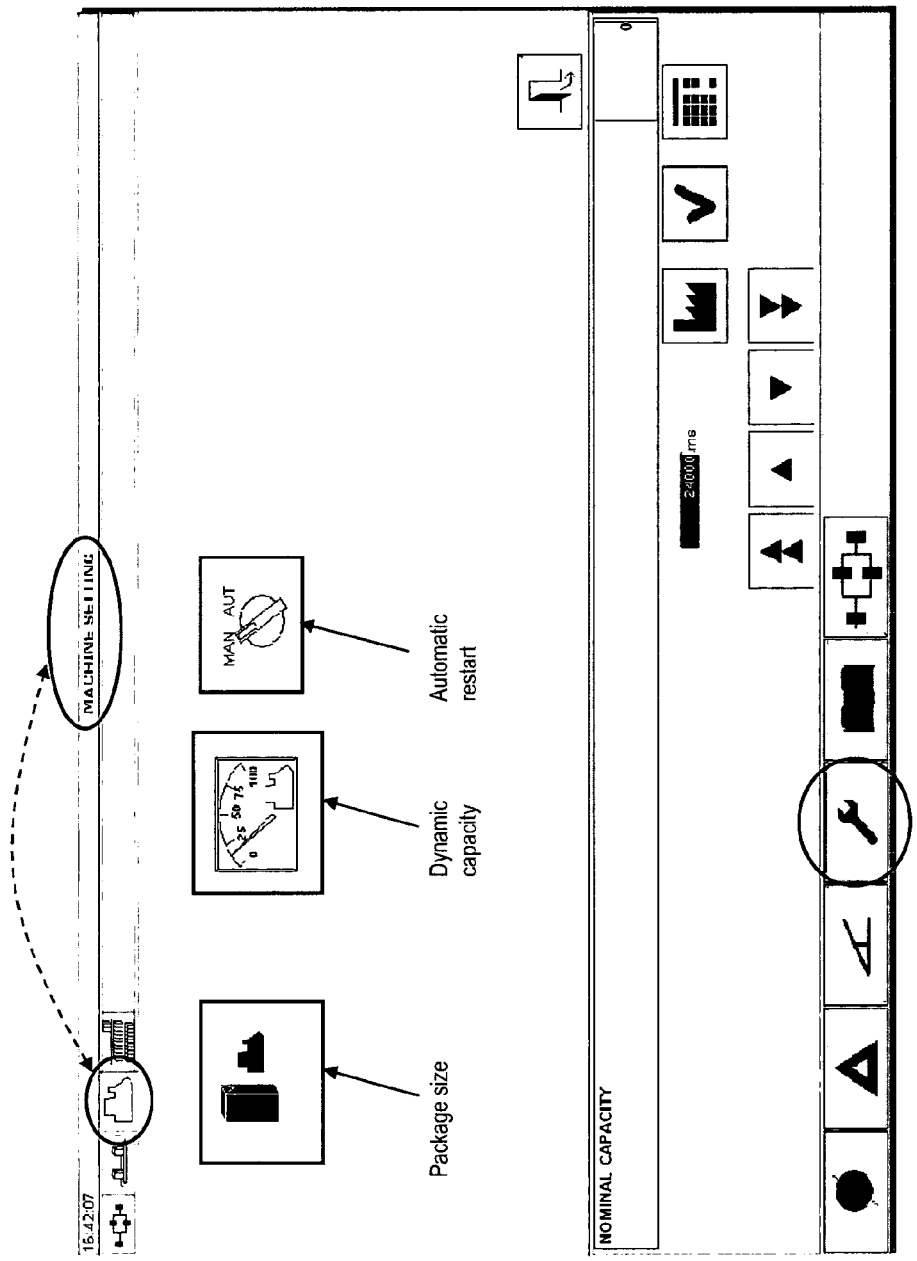

FIG. 15 shows the configuration window related to the Filling Machine Mode function, which allows the operator to set the selectable production capacity (packages/hour), the dynamic production capacity (packages/hour), and the type of automatic restart (manual/automatic) of the Filling Machine.

Figure 16:
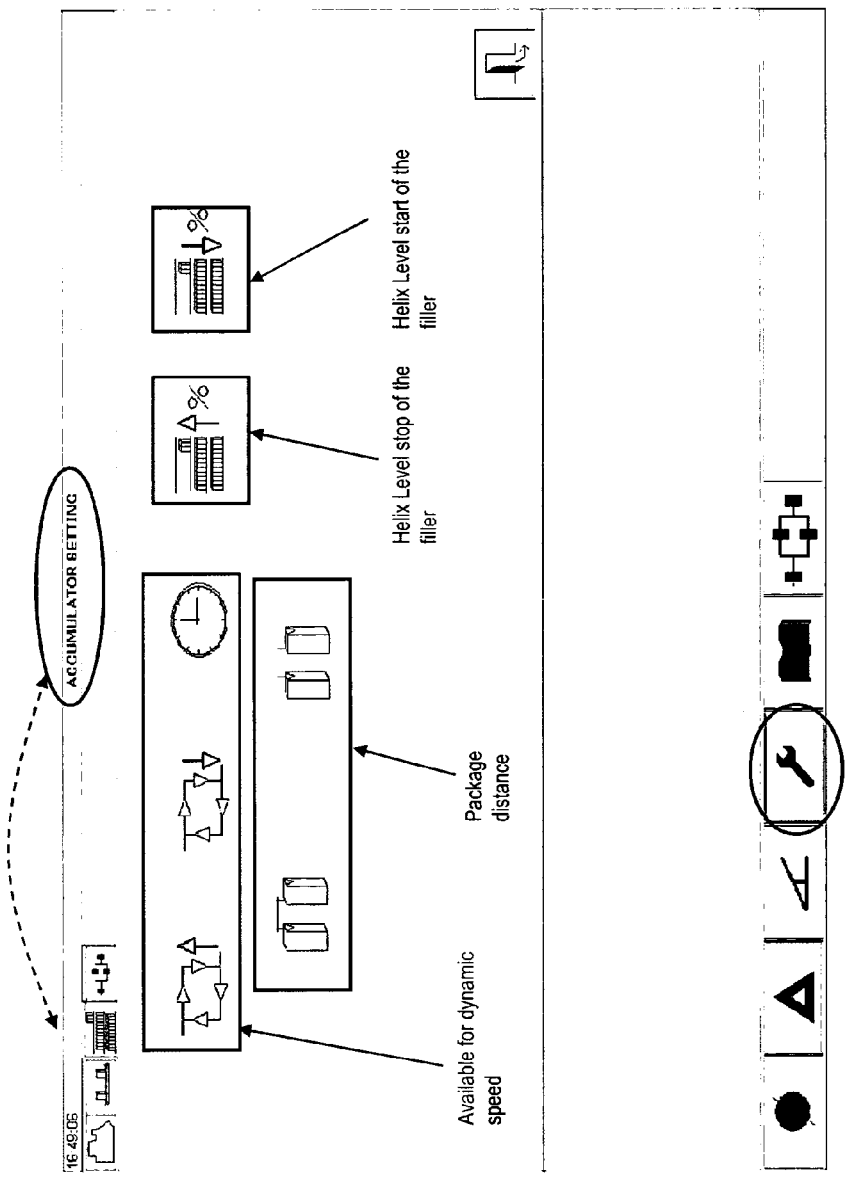

FIG. 16 shows the configuration window of the Graphical User Interface related to the Accumulation Mode function, which allows the operator to set the parameters of each individual Accumulator in the Packaging Line, such as whether it is available for dynamic speed, the package distance, the level stop and the level start of the filler, etc.

Coming back to the software applications in the Line Controller, the Line Commander is the software application designed to optimize the Packaging Line performance and to control the package transportation. This functionality is very important in order to avoid damages to the packages, in particular to prevent packages from crashing due to long queues at the inlets of the Distribution Equipments or high package flow rate with respect to the capacity of the Packaging Line, and to guarantee the aseptic integrity.

In particular, the start/stop policy defines the start/stop sequence and delays of the Filling Machine and the Distribution Equipments after a start/stop of any of the Filling Machine and the Distribution Equipments in the Packaging Line, so as to prevent package queues from forming, with a length higher than a given value, at the inlet of any Distribution Equipment during a start/stop transitional phase of the production. In this way, compared to the previous generation of Packaging Lines, the Line Controller of the present invention allows the start/stop of the Filling Machine or any Distribution Equipment to be anticipated or delayed, so making it possible, for example, to anticipate the reception of the packages in a Distribution Equipment or to defer the restart of the upstream Filling Machine or Distribution Equipment.

The flow control policy is a dynamic control of the flow of packages in the Packaging Line. The regulation and control of the package flow allows a substantially constant distance to be achieved between packages or package units, so as to prevent them from crashing and package queues from forming, with a length higher than a given value, at the inlet of any Distribution Equipment during the continuous changes in the capacity of the Packaging Line during the discharge phase of the accumulator.

The possibility of controlling the package flow and the capacity of the Distribution Equipments allows the capacity of the Packaging Line to be adapted to the real capacity of the customer plant (palletizer, pallet wrapper, customer equipment). In turn, the capacity adaptation makes it possible to process the packages with a constant flow that ensure a better control of the package transportation. That functionality guarantees a higher flexibility compared to the previous generation of Packaging Lines, with the Distribution Equipments that process the packages at the maximum capacity available with the creation of a regular package flow. All the parameters for the control of the package transportation are different for each Packaging Line layout.

In particular, the Line Commander is designed to carry out the following tasks during production:

Packaging Line supervision: operation of the Filling Machine, the Distribution Equipments and the Conveyors of the Packaging Line is supervised to optimize the Packaging Line performance and the product transportation. A basic visual information, such as production information, equipment stop, material request, line phase, etc., is provided via the common overhead message display, while a detailed visual information is provided via the display of the Line Controller, wherein a production page is displayed wherein individual parts of the Packaging Line are differently colored based on the information to be provided, and in particular:

Green: production
Gray: not present in the Line Recipe
White: preparation
Green Flashing: ready for production
Yellow: block
Yellow flashing: blocking; the Filling Machine or the Distribution Equipment receives o delivers packages but it is present an alarm;

command dispatch and automatic restart: start/stop commands are dispatched to the Filling Machine, the Distribution Equipments, and the Conveyors in the Packaging Line other than those of the Filling Machine and the Distribution Equipments and directly controlled by the Line Controller, according to a start/stop policy that drives the start and stop phase in the Packaging Line. For example, distribution is stopped when no more packages are coming from upstream Distribution Equipments or when a downstream Distribution Equipment is blocked, so preventing the packages from crushing or getting damaged; and when in an out-feed Conveyor of a Distribution Equipment the queue photocell sensor activates, this Distribution Equipment stops autonomously, and the Line Commander stops the upstream Distribution Equipment(s);

operating parameter transmission: operating parameters are transmitted to the Filling Machine and the Distribution Equipments of the Packaging Line to optimize the Packaging Line performance and the product transportation;

product flow control policy: an algorithm is implemented to optimize the production and the package flows by dynamically regulating the capacity of the Filling Machine and of each single Distribution Equipment, so minimizing package queues and optimizing package accumulation. Filling Machine and Distribution Equipments operating states are collected and commands for the Filling Machine and each Distribution Equipment are generated based on the product flow control policy. For example, when in an in-feed Conveyor of a Distribution Equipment the speed photocell sensor activates, the Distribution Equipment increases its capacity and does not take any action at Packaging Line level; and when in an in-feed Conveyor of a Distribution Equipment the overflow photocell sensor activates, the Line Commander decreases the capacity of the upstream Distribution Equipment.

Figure 17:
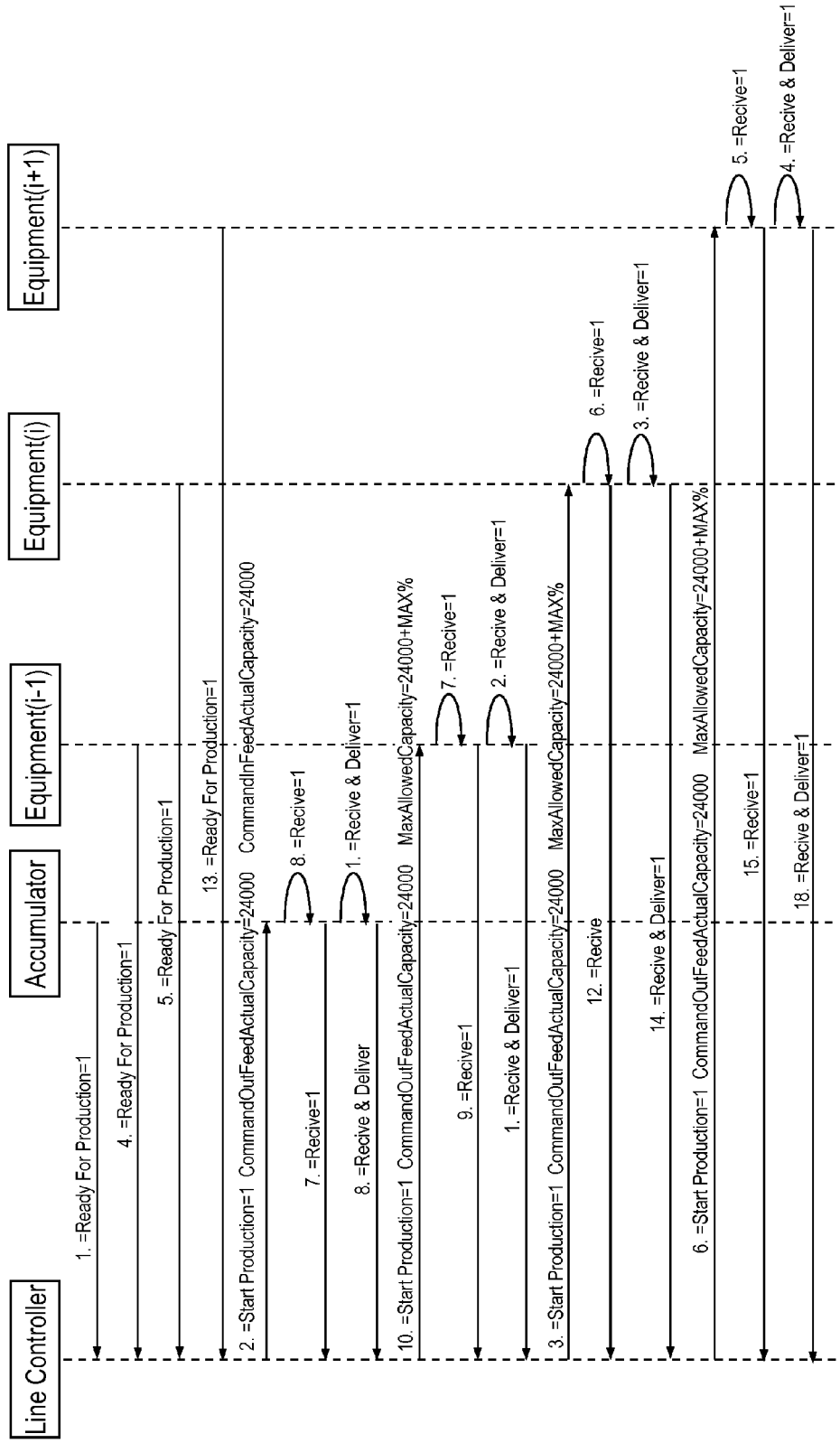
FIGS. 17 and 18 show commands and reply messages exchanged between the Line Commander and the Distribution Equipments to implement a start/stop policy.
Figure 18:
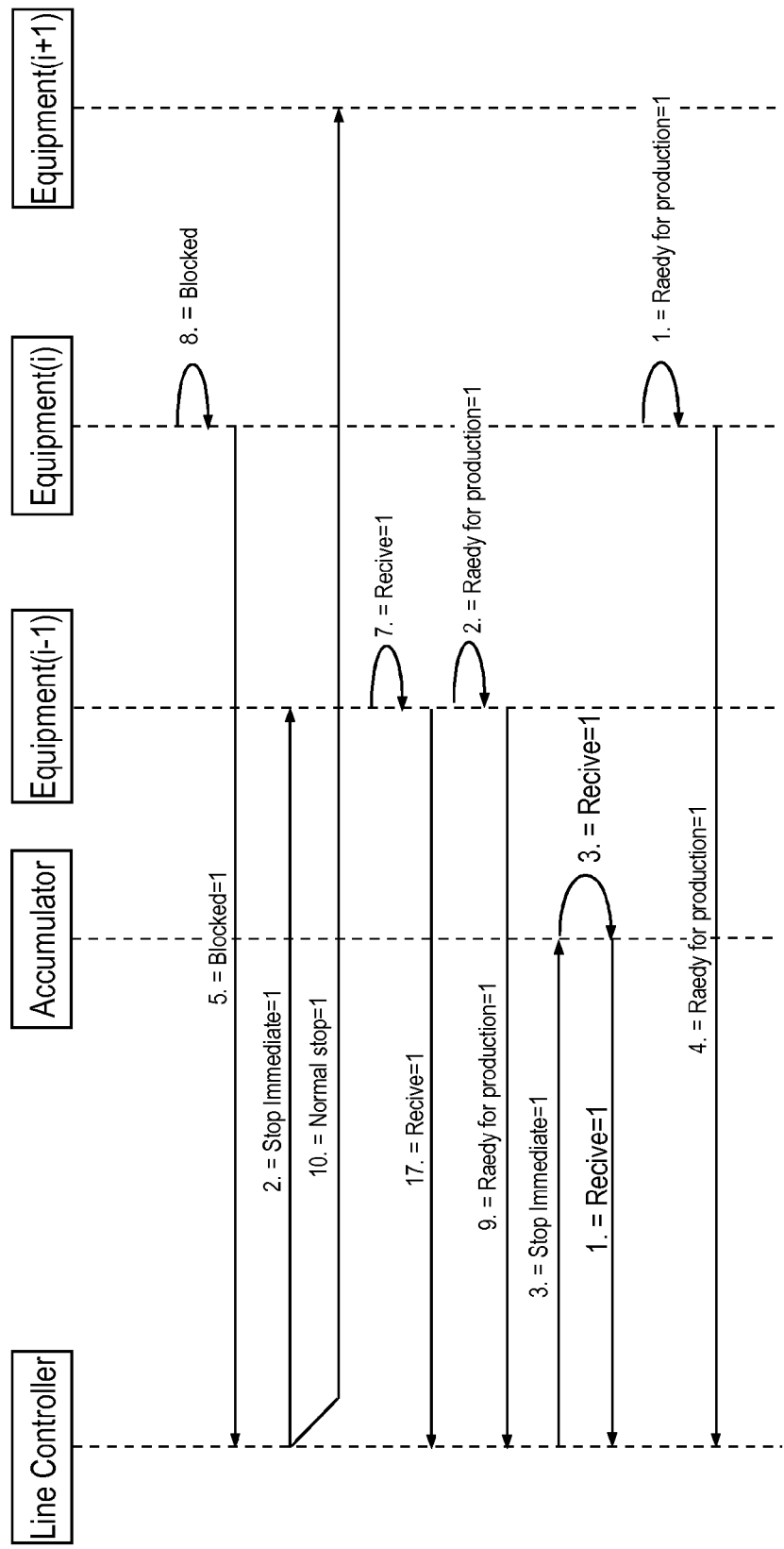
Figure 19:
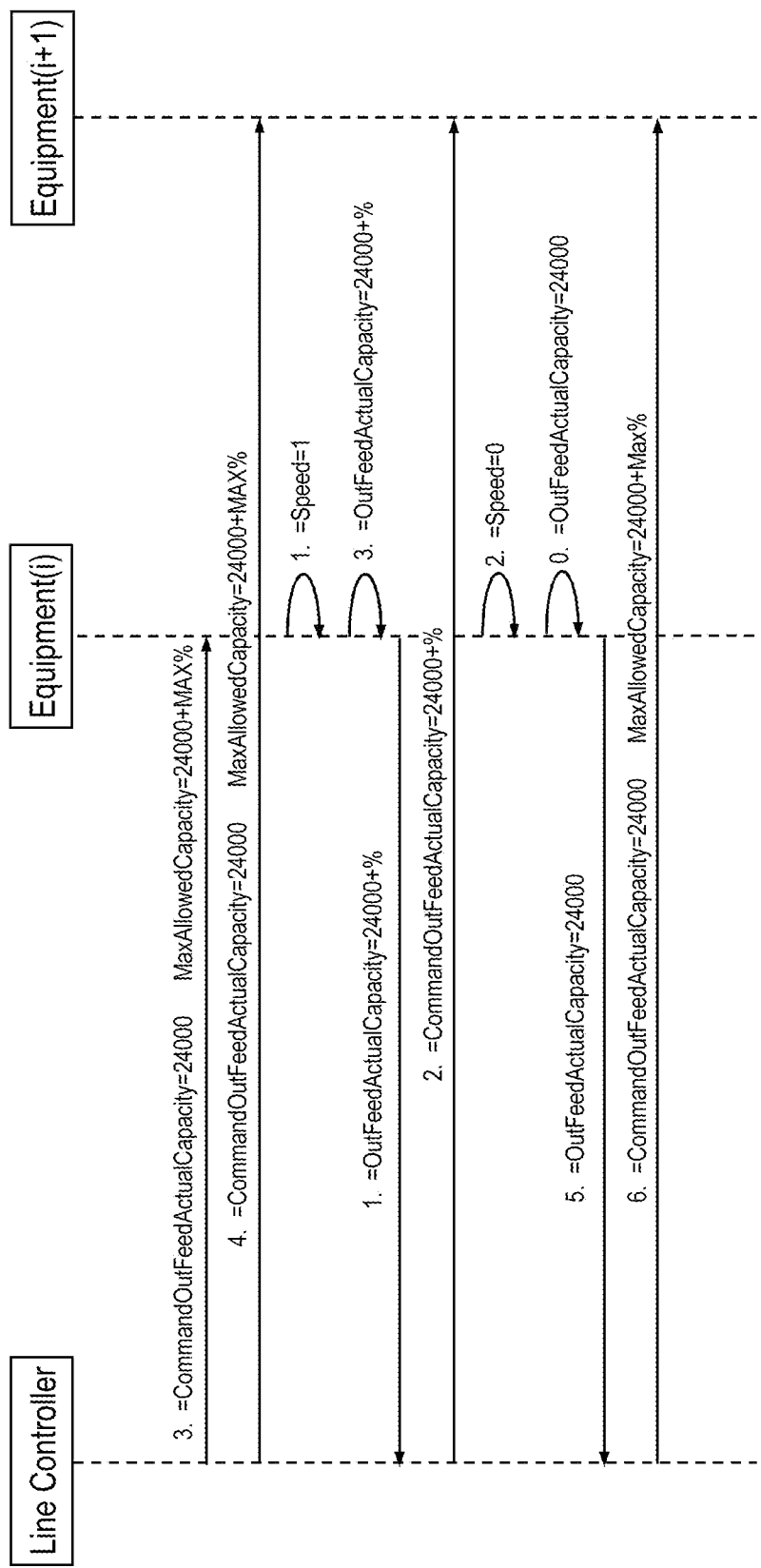
FIGS. 19 to 21 show commands and reply messages exchanged between the Line Commander and the Distribution Equipments to implement a package flow control policy.
Figure 20:
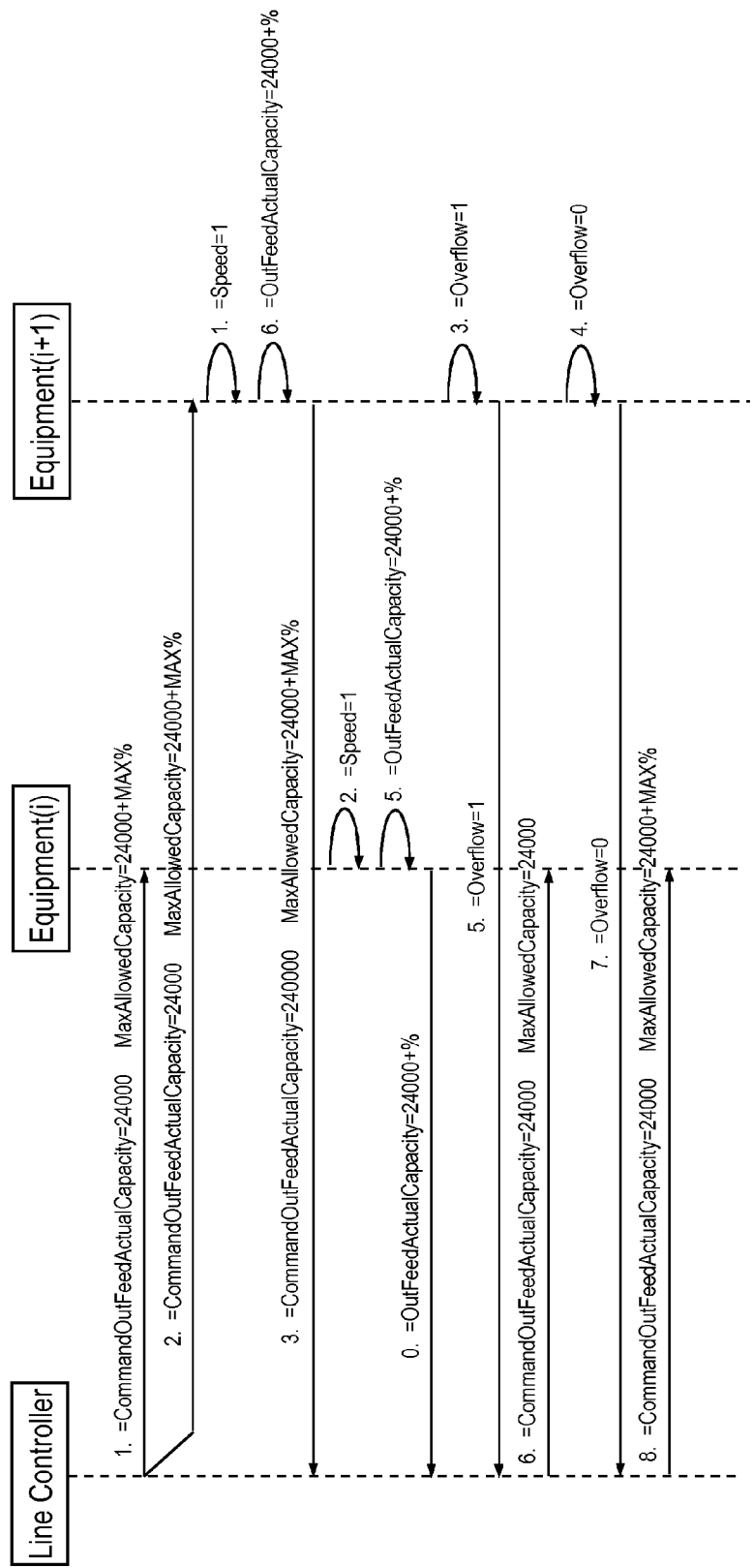
Figure 21:
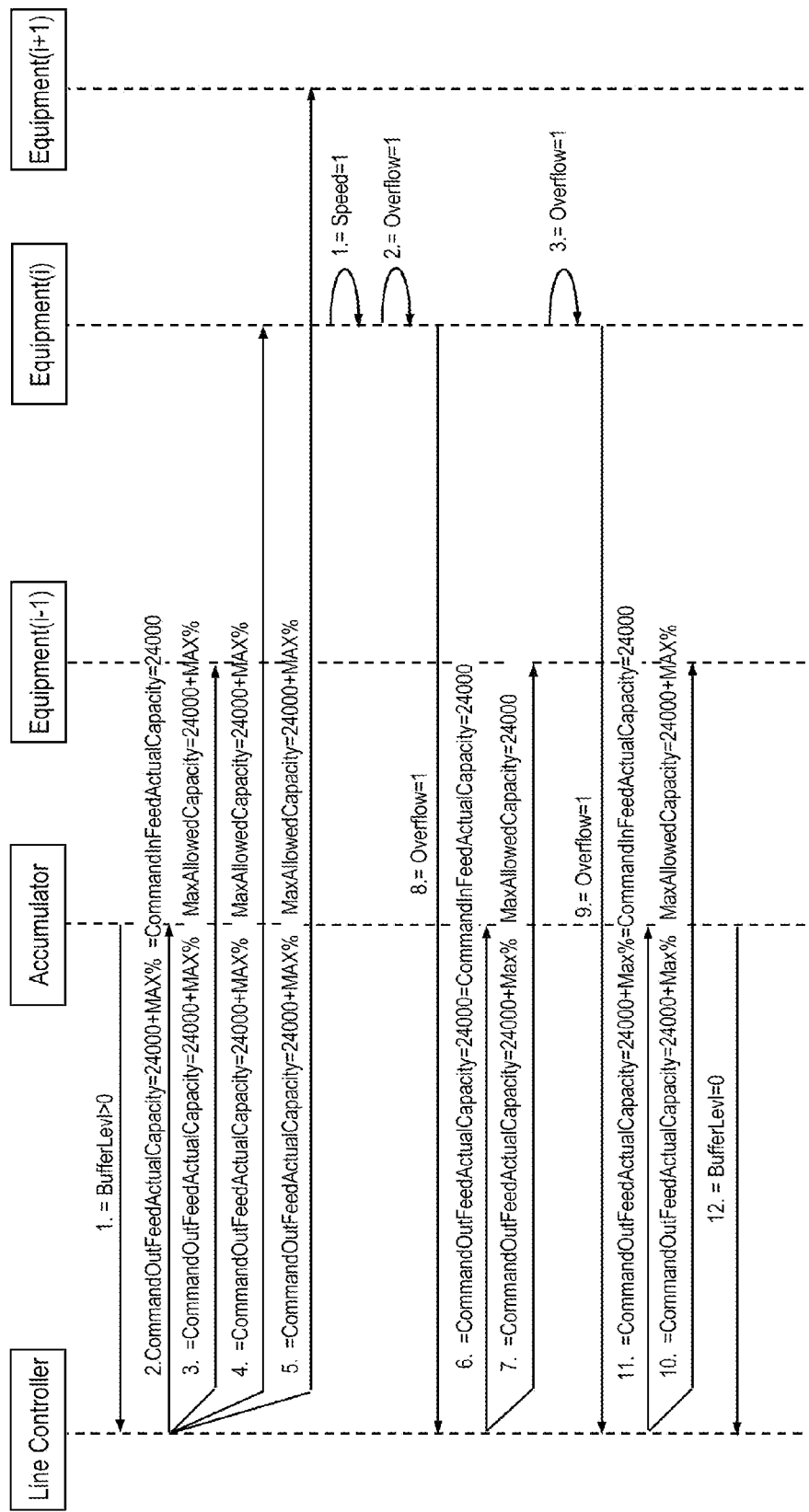

FIGS. 17 and 18 show commands and reply messages exchanged between the Line Commander and Distribution Equipments to implement a start/stop policy, while FIGS. 19 to 21 show commands and reply messages exchanged between the Line Commander and Distribution Equipments to implement a package flow control policy.

In particular, FIG. 17 shows commands and reply messages exchanged between the Line Commander, an Accumulator, and three downstream Distribution Equipments, respectively referenced by "Equipment(i−1)", "Equipment(i)", and "Equipment(i+1)", during an automatic start procedure. In detail, when the Accumulator and the Distribution Equipments have notified the Line Commander that they are ready for production, the Line Commander initializes the Accumulator by sending thereto a command containing in-feed and out-feed capacities, in this example both equal to 24.000 packages/hour, and information that the production by the Filling Machine has started. Then, when the Accumulator starts to receive packages and also to deliver packages, it notifies the Line Commander accordingly via corresponding messages. Then, the Line Commander initializes the three Distribution Equipments by sending thereto respective commands containing their nominal capacities and overcapacities, in this example equal to 24.000 and 24.000+MAX % packages/hour, respectively, and information that the production by the Filling Machine has started. Then, when the Distribution Equipments starts to receive packages and also to deliver packages, they notify the Line Commander accordingly via corresponding messages.

FIG. 18 shows commands and reply messages exchanged between the Line Commander, the Accumulator, and the three Distribution Equipments of FIG. 17 during an automatic immediate stop procedure. In detail, when a Distribution Equipment blocks, in this example the one referenced by "Equipment(i)", the Line Commander is notified of this event via a corresponding message from the blocked Distribution Equipment. In response to this message, the Line Commander sends an immediate stop command to the Distribution Equipment upstream from the blocked Distribution Equipment, in this example the one referenced by "Equipment(i−1)", to stop it immediately, i.e., without completing the processing of the packages already fed to the Distribution Equipment, and a normal stop command to the Distribution Equipment downstream of the blocked Distribution Equipment, in this example the one referenced by "Equipment(i+1)", to stop it normally, i.e., after having completed the processing of the packages already fed to the Distribution Equipment. The Distribution Equipment upstream from the blocked Distribution Equipment acknowledges receipt of the command from the Line Commander, and subsequently notified the Line Commander that it is ready for production, via corresponding messages. Then, the Line Commander sends an immediate stop command to the Accumulator to stop it immediately, and the Accumulator sets autonomously in a package receive condition, and notifies the Line Commander accordingly via a corresponding message. In the end, when the blocked Distribution Equipment returns operative after an operator intervention, the unblocked Distribution Equipment notifies the Line Commander via a corresponding message.

FIG. 19 shows commands and reply messages exchanged between the Line Commander and two downstream Distribution Equipments, referenced by "Equipment(i)" and "Equipment(i+1)", when the speed photocell sensor of the in-feed Conveyor of the first Distribution Equipment just downstream of the Filling Machine, in this example the one reference by "Equipment(i)", activates. As shown, initially the Line Commander initializes the two Distribution Equipments by sending thereto respective commands containing their operating nominal capacities and overcapacities, in this example 24.000 and 24.000+MAX % packages/hour, respectively. When the speed photocell sensor of the in-feed Conveyor of the first Distribution Equipment activates, the first Distribution Equipment autonomously switches its operating capacity from the nominal capacity to the overcapacity, and notifies the Line Commander accordingly by sending a corresponding message. In response to this message, the Line Commander sends to the second Distribution Equipment "Equipment(i+1)" a command to switch its operating capacity from the nominal capacity to the overcapacity. After a while, the speed photocell sensor of the first Distribution Equipment "Equipment(i)" should deactivate, and when this happens the first Distribution Equipment autonomously switches its operating capacity from the overcapacity to the nominal capacity, and notifies the Line Commander accordingly by sending a corresponding message. In response to this message, the Line Commander sends to the second Distribution Equipment "Equipment(i+1)" a command to switch its operating capacity from the overcapacity to the nominal capacity.

FIG. 20 shows commands and reply messages exchanged between the Line Commander and the two downstream Distribution Equipments of FIG. 19 when the speed photocell sensors of the in-feed Conveyors of both Distribution Equipments activate, and when the overflow photocell sensor of the in-feed Conveyor of the second Distribution Equipments "Equipment(i+1)" activates. In this scenario, the two Distribution Equipments react to the activation of the respective speed photocell sensors in the same way as what has been previously described with reference to FIG. 19 by autonomously switching their operating capacities from the nominal capacities to the overcapacities, and notifying Line Commander accordingly. When the overflow photocell sensor of the in-feed Conveyor of the second Distribution Equipments "Equipment(i+1)" activates, the Line Commander is notified accordingly by a corresponding message from the second Distribution Equipments "Equipment(i+1)". In response to this message, the Line Commander sends a command to the first Distribution Equipment "Equipment(i)" to reduce its current overcapacity to a value equal to the nominal capacity, in this example 24.000 packages/hour. After a while, the overflow photocell sensor of the second Distribution Equipment "Equipment(i+1)" should deactivate, and when this happens the Line Commander is notified accordingly by a corresponding message from the second Distribution Equipment "Equipment(i+1)". In response to this message, the Line Commander sends a command to the first Distribution Equipment "Equipment(i)" to restore the initial value of the overcapacity thereof, in this example 24.000+MAX %.

FIG. 21 shows commands and reply messages exchanged between the Line Commander, an Accumulator, and three downstream Distribution Equipments, referenced by "Equipment(i−1)", "Equipment(i)", and "Equipment(i+1)", when both the speed and the overflow photocell sensors of the in-feed Conveyor of the intermediate Distribution Equipment, in the example the one referenced by "Equipment(i)", activate. As shown, initially the Line Commander initializes the Accumulator, by sending thereto a command containing the in-feed and out-feed capacities, in this example 24.000 and 24.000+MAX % packages/hour, respectively, and the three Distribution Equipments, by sending thereto respective commands containing their operating nominal capacities and overcapacities, in this example both equal to 24.000+MAX % packages/hour. When both the speed and the overflow photocell sensors of the in-feed Conveyor of the second Distribution Equipment "Equipment(i)" activate, the Line Commander is notified of the activation of the overflow photocell sensor by a corresponding message from the second Distribution Equipment "Equipment(i)". In response to this message, the Line Commander sends commands to the Accumulator and to the first Distribution equipment "Equipment (i−1)" to reduce the out-feed capacity of the former and the overcapacity of the latter to a value equal to the in-feed capacity of the Accumulator, in this example 24.000 packages/hour. After a while, the overflow photocell sensor of the second Distribution Equipment "Equipment(i)" should deactivate, and when this happens the Line Commander is notified accordingly by a corresponding message from the second Distribution Equipment "Equipment(i)". In response to this message, the Line Commander sends a command to the Accumulator and to the first Distribution Equipment "Equipment (i−1)" to restore the initial values out-feed capacity of the former and the overcapacity of the latter, in this example 24.000+MAX % packages/hour.

Finally, Line Commander is further designed to start warming up the Filling Machine and the Distribution Equipments involved in the production according to an energy saving policy which is intended to prevent a complete warm-up of the Filling Machine or an involved Distribution Equipment while the others are still warming up. In particular, the Line Commander is designed to allow warm-up start times to be set for the Filling Machine and each involved Distribution Equipment based on the ambient operating conditions.

Coming back to the software applications in the Line Controller, the Recipe Manager is the software application designed to automatically configure the Packaging Line to implement a Line Recipe selected by an operator via the Line Controller, during which the Filling Machine and a set of individual Distribution Equipments in the Packaging Line are identified to cooperate in producing a desired final package unit. In particular, the Filling Machine and each individual Distribution Equipment in the Packaging Line are configured to implement one or more selectable Equipment Recipes, which are stored in the corresponding Filling Machine and Distribution Equipments, and allow specific intermediate package units to be produced. More in detail, an Equipment Recipe for the Filling Machine defines the type of sealed packages to be produced by the Filling Machine, whereas an Equipment Recipe for a Distribution Equipment defines the operation(s) to be carried out by the Distribution Equipment on individual or groups of sealed packages.

Further in detail, a Line Recipe specifies:
the Packaging Line layout (package path), namely the Distribution Equipments and Conveyors to be involved in the production of the final package unit;
Equipment Recipes to be implemented by the Filling Machine and the involved Distribution Equipments; and
Packaging Line automation parameters, namely the operating parameters to be used in the Packaging Line (conveyor speeds, photocell timing, control/command delays, Filling Machine and Distribution Equipment capacity) for controlling the package flow;
whereas an Equipment Recipe specifies:
Recipe definition parameters, which identify the characteristics of sealed packages or package units to be produced, or an operation to be carried out. For example, for a Cardboard Packer, these parameters may include the package pattern in the tray, and the typology of the tray, while for a Filling Machine, these parameters may include the volume and the shape of the package, the typology of opening device, etc.; and
Recipe-dependent operating parameters, such as speed, temperature, pressure, etc., which are specific for the sealed packages, package units or operations defined by the Recipe definition parameters.

The Line and Equipment Recipes are based on a scalable and modular concept, namely the Equipment Recipes collect all the information needed by each Machine or Equipment to obtain a defined package unit, while the Line Recipe just refers to these Equipment Recipes. In this way, the Line Recipe doesn't need to contain directly all the detailed parameters of the Filling Machine and each Distribution Equipment, but just recall a defined set of Equipment Recipes.

Figure 22:
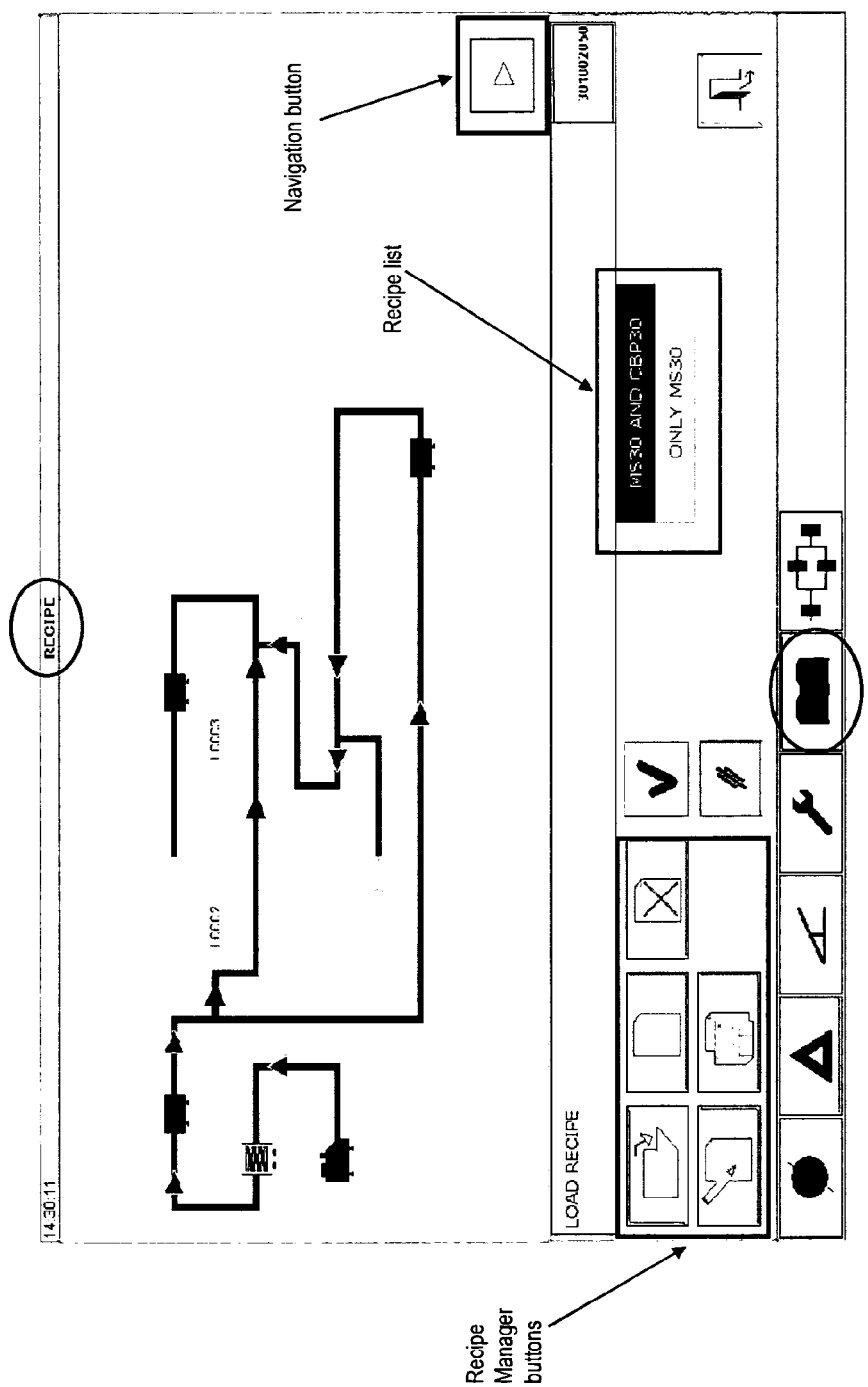
FIG. 22 shows a configuration window related to a Recipe Configuration function.

Hence, as shown in FIG. 22, when an operator selects, via the keyboard of the Line Controller, a desired Line Recipe, identified by an associated name or ID code, the Recipe Manager is configured to determine the individual intermediate package units to be involved in the production of the desired final package unit corresponding to the selected Line Recipe. Based on that, the Recipe Manager determines the specific Packaging Line layout, namely the specific configuration of individual Distribution Equipments in the Packaging Line to be involved in the production of the desired final package unit corresponding to the selected Line Recipe, and the individual Equipment Recipes, identified by an associated name or ID code, in the Filling Machine and in each individual identified Distribution Equipment to be implemented for the production of the identified intermediate package units. When the individual Equipment Recipes have been identified, the Recipe Manager is configured to upload in the Line Controller the tuning and automation parameters of the Packaging Line stored in the aforementioned compact flash memory card, and associated with the Line Recipe, and to download into the Filling Machine and the identified Distribution Equipments, before the production is started, the respective individual Equipment Recipes to be implemented and the uploaded tuning and automation parameters. The Filling Machine and each identified Distribution Equipment upload the operating parameters stored in the respective compact flash memory cards, and associated with the Equipment Recipe received from the Recipe Manager.

Figure 23:
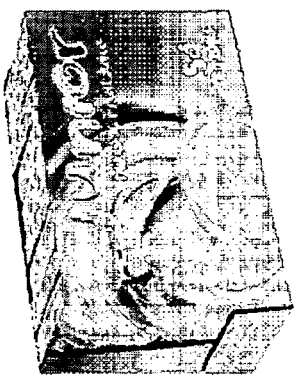
FIGS. 23 and 24 are exemplary of initial, intermediate and final packages related to two different Line Recipes.
Figure 23:
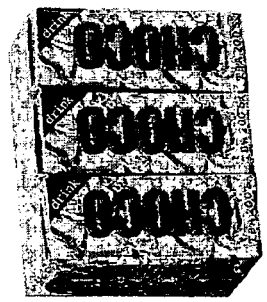
Figure 23:
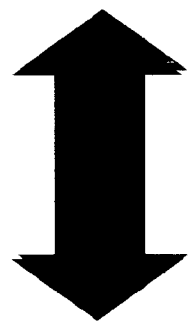
Figure 24:
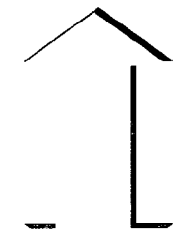
Figure 24:
Figure 25:
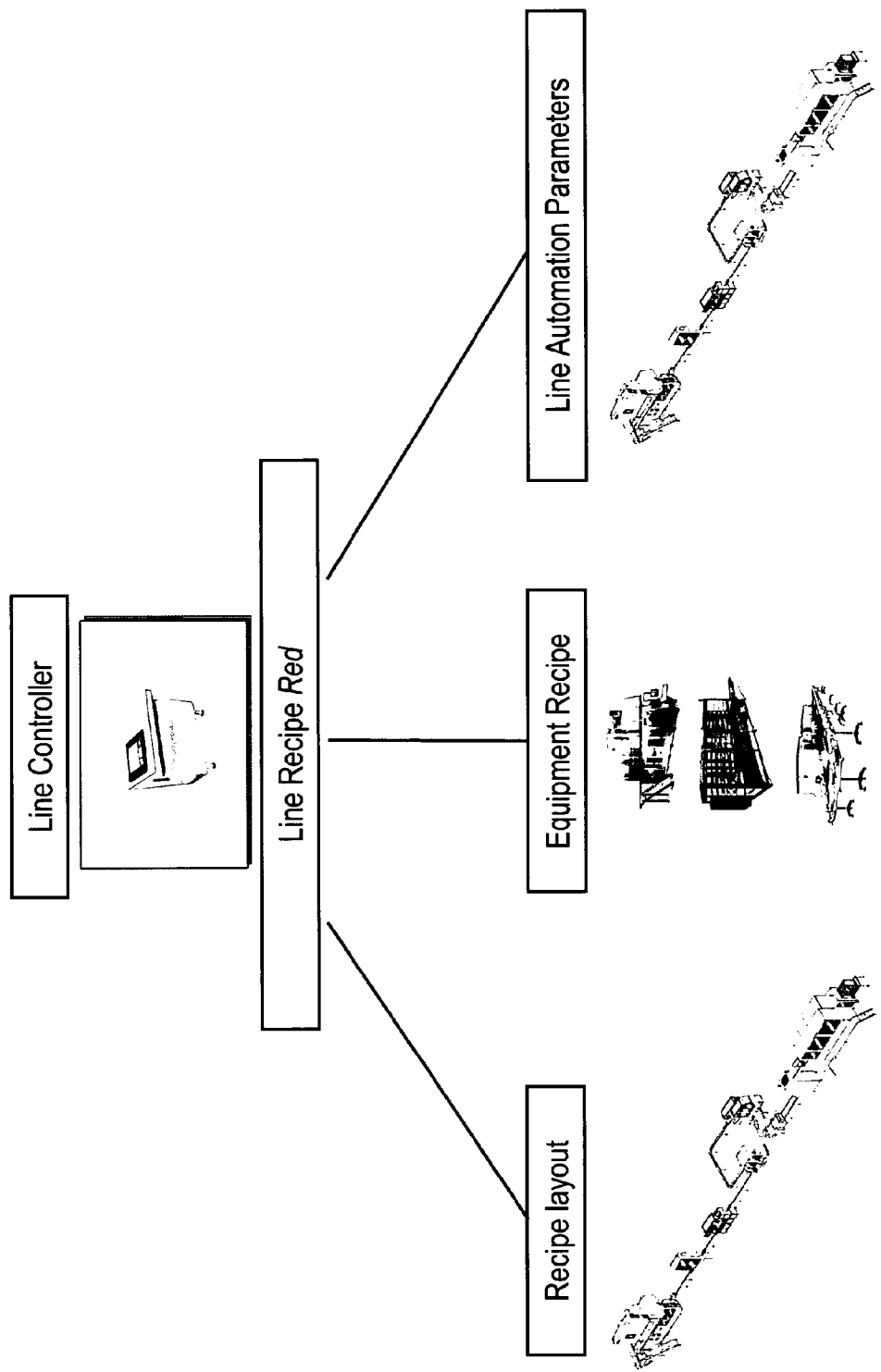
FIG. 25 shows a block diagram depicting a Line Recipe definition process.

FIGS. 23 and 24 are exemplary of the initial, intermediate and final package units related to two different Line Recipes named Red and Green, respectively, while FIG. 25 depicts the Line Recipe definition.

To do so, the Recipe Manager is designed to allow the following functionalities to be selected and executed, and to carry out the following tasks:

Recipe Configuration, which allows an operator to create (define/edit) and store a Line Recipe, and to carry out different operations, such as Packaging Line layout definition, Line and Equipment Recipe selection, Packaging Line capacity definition, etc., via Recipe Manager softkeys. To allow a Line Recipe to be created, the Recipe Manager is designed to upload from the Filling Machine and the Distribution Equipment the production/operating parameters associated with the Equipment Recipes. FIG. 16 shows the configuration window related to the Recipe Configuration function;

Recipe Execution, which allows a created Line Recipe to be selected and started up via the Recipe Manager softkeys;

Production Interlocking, which allows human dependency in controlling key production parameter to be reduced;

Machine Interlocking, which allows mismatches between Line and Equipment Recipes to be avoided;

Layout Interlocking, which allows mismatches in layout configuration to be avoided;

Production Material Interlocking, which prevents any mismatch between the type of material introduced by an operator in the Filling Machine and in the involved Distribution Equipments (packaging material, cap, straw, glue, etc.) and the type of material defined in the Line Recipe; and PLMS Data Handler, which allows factory floor data related to the selected Line Recipe to be automatically provided to a Product and Packaging Line Monitoring System (PLMS) Centre, which will be described in detail hereinafter.

The possibility of controlling in an automatic way the Line Recipe parameters (raw materials utilized in the production, configuration of the single Distribution Equipment), increases the quality level of final package unit produced by the Packaging Line, and enables the traceability of the raw material used in the production. Another characteristic is the use of specific line automation parameter for the Line Commander and Conveyor Optimizer for each recipe,) this ensure to optimize the line performance. Additionally, the Recipe Manager guarantees the use of the right parametrization in the active Line Recipe.

Figure 26:
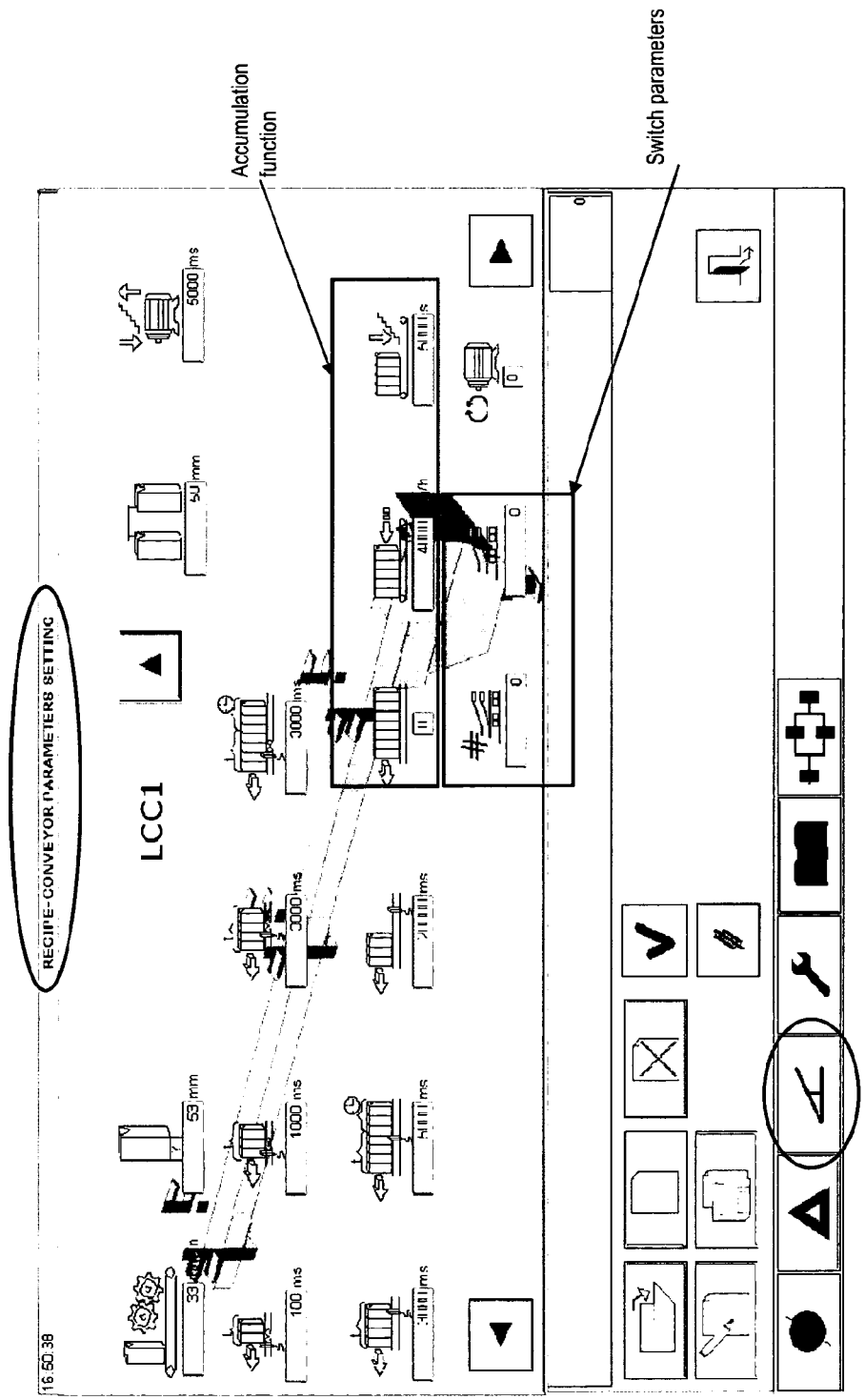
FIG. 26 shows a configuration window related to a Conveyor Settings function.
Figure 27:
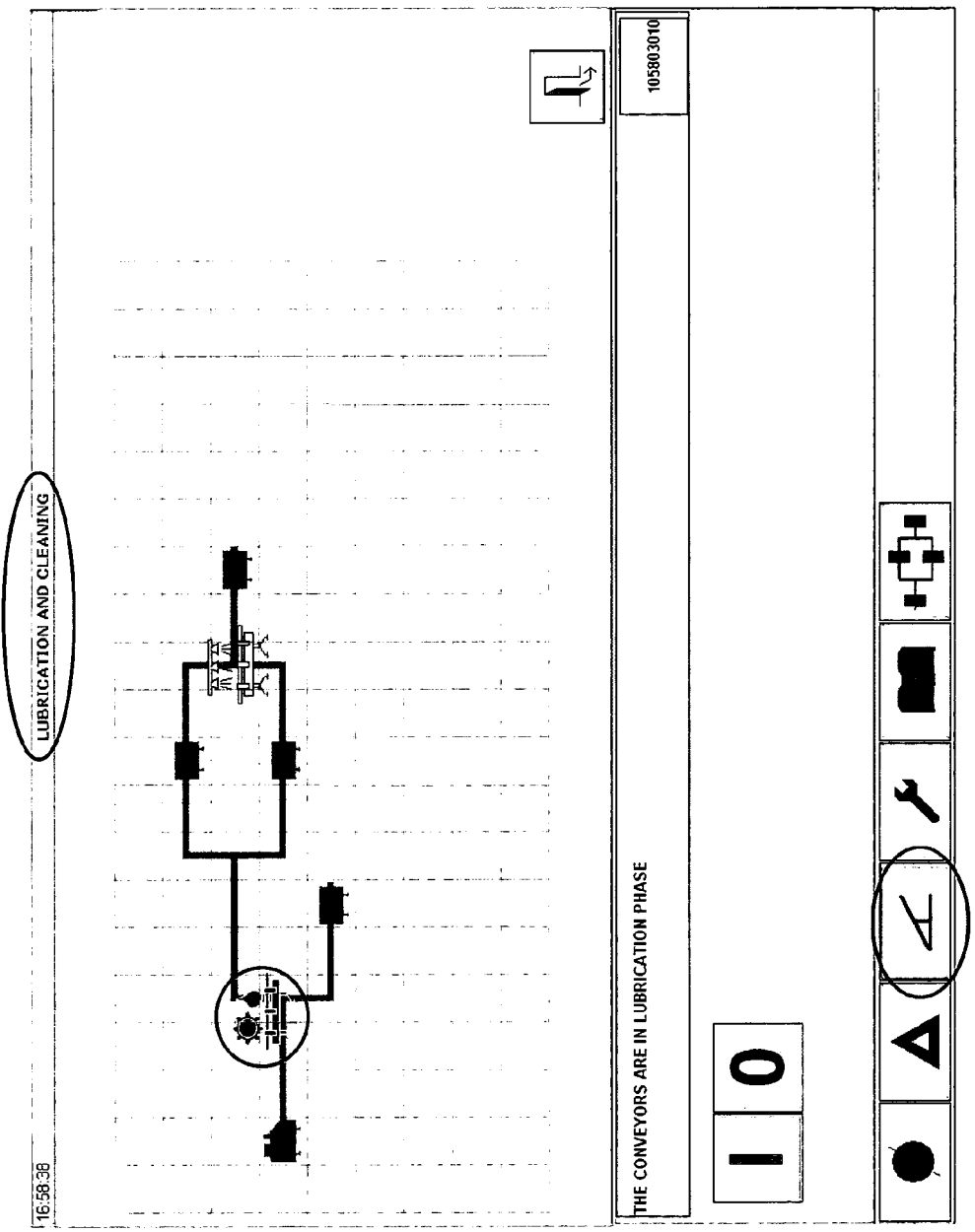
FIG. 27 shows a configuration window related to a Conveyor Lubricating and Cleaning function.

With reference again to the software applications in the Line Controller, the Conveyor Optimizer is the software application designed to optimize package transportation along the Packaging Line. In particular, the Conveyor Optimizer allows an operator to select and execute the following functions:

Conveyor Settings, which allows the operator to set the operating parameters of each Conveyor in the Packaging Line other than those of the Filling Machine and the Distribution Equipment and directly controlled by the Line Controller, such as the Conveyor speed, the package width, the package distance, the Configuration Switch parameters, the accumulation function, etc. FIG. 26 shows the configuration window related to the Conveyor Settings function. The example shown in FIG. 26 relates to the setting of the operating parameters of the Conveyor LCC1; and Lubrication and Cleaning, which allows the operator to operate a Conveyor lubricating and cleaning unit. FIG. 27 shows the configuration window related to the Conveyor Lubrication and Cleaning function.

Coming back to FIG. 1, the PLMS Centre is a data management system designed to monitor the operational performance of the Filling Machine and the Distribution Equipments in the Packaging Line, and to maximise operational equipment performance based on plant floor data. The PLMS Centre also provides powerful and easy-to-use tools to analyze operational equipment performance and process behavior. Operational performance data are automatically captured and logged at the Packaging Line. Local manual input interaction makes data comprehensive. Information distribution to the factory office level allows real-time supervision and historical analysis. The PLMS Centre allows optimum results to be achieved through the timely identification of downtime issues. The analysis of the production performance details identifies the critical performing equipment, and charts and reports are the tools to identify highest downtime reasons.

One of the main features provided by the PLMS Centre is the traceability and process monitoring function. Through a Graphical User Interface, an Operator Sheet is provided which is the electronic replacement of the production paper handwritten document. Data can be entered on operator demand or automatically requested by the system based on equipment events. Data entry is possible through manual input or using a barcode scanner. Data logged in the Operator Sheet may for example be operator production checks, material used by the Packaging Line, such as packaging material, strips, caps, straws, etc., special production events such as batch id, batch start, batch stop, etc., operator IDs, locally-defined custom events, etc. Based on the data logged at the Filling Machine, the PLMS Centre carries out a performance analysis and provides an Operator Sheet Report. This allows monitoring of process parameters and critical control points during production. Process monitoring gives the possibility to execute advanced trouble shooting on machine process variables.

The PLMS Centre also allows comprehensive traceability to be achieved by time synchronization. In fact, the PLMS Centre offers the possibility to synchronize the data logging time to a central time synchronization system, and the dating unit clock is synchronized locally by PLMS data logging system clock.

Figure 28:
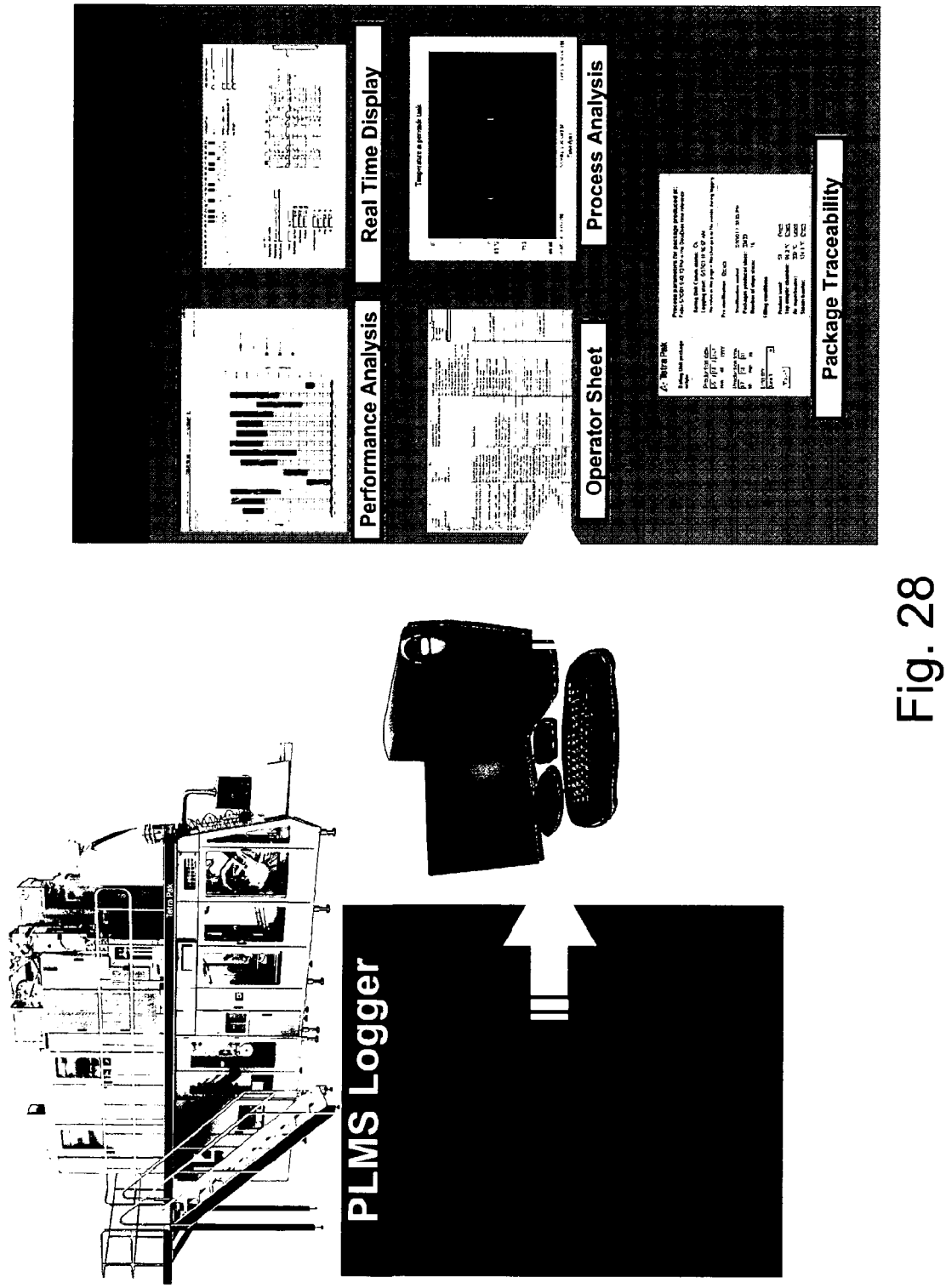
FIG. 28 shows schematically the tasks carried out by a PLMS Centre.

More in detail, as shown in FIG. 28, the PLMS Centre is designed to carry out the following tasks:

Performance Analysis,
Real Time Display,
Process Analysis,
Package Traceability, and
Manufacturing Execution Systems (MES) Integrator.

In particular, the Performance Analysis task includes:

Analysis with graphs:
Packaging Line, Filling Machine and Distribution Equipment performance analysis, Packaging Line and Filling Machine performance comparison,
Efficiency analysis,
Downtime, waste and frequency analysis, and
Trend;
Analysis with reports:
Production, waste, stop, summary reports,
Event report;
Operator Sheet reports; and
Analysis by shift, days, weeks, months or years.
The Real Time Display task includes:
Packaging Line Supervision:
Packaging Line real time status overview,
Filling Machine and Distribution Equipment status,
Produced package counters,
Package waste indication, and
Equipment event list;
Short term analysis tool:
Current and previous shift/day analysis,
Top 10 list of stop reasons, and
Main Line performance measures.
The Process Analysis task includes:
Process variable trend examination:
Analog variables,
Digital signals,
Set-Point values; and
Process analysis:
Cursors for absolute/relative values,
Variable comparison, and
Zoom and Pan functions.
The Package Traceability task includes:
Per-Package process tracing:
Process parameters,
Set-point values, and
Relevant event history (stops, cleaning, etc.);
Per-Package material bill:
Operator sheet information,
Packaging material/Strip/Tabs/Caps, and
Product batch ID.
In the end, the MES Integrator task provides an open interface based on XML standards and includes:
Per-Batch tracking:
Performance indicators,
Counter values (Packages/units produced, waste, etc.), and
Relevant event history;
Per-Batch material bill:
Operator sheet information,
Packaging material/Strip/Tabs/Caps, and
Product batch ID.

Figure 29:
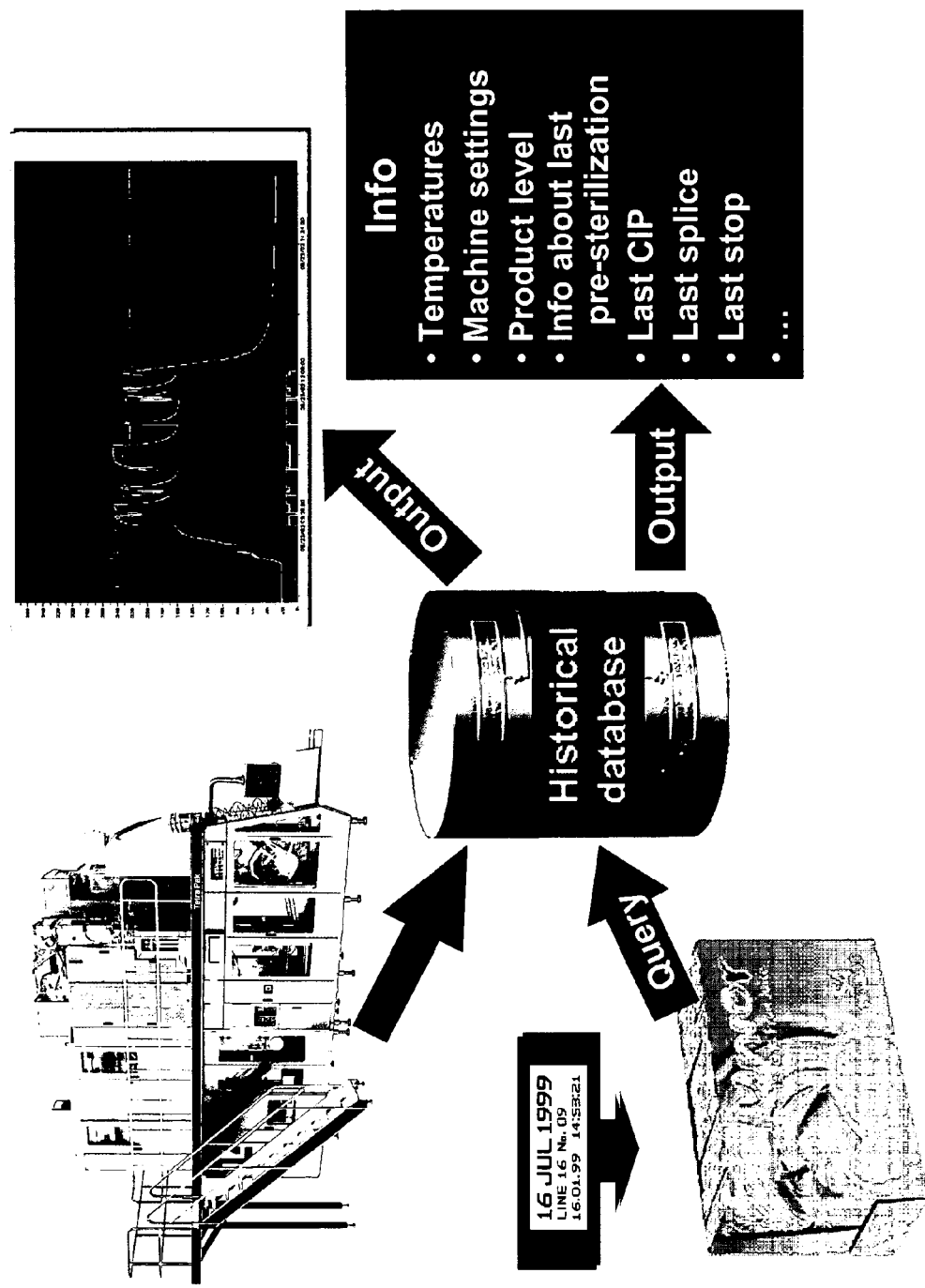
FIG. 29 shows a block diagram depicting the package traceability task carried out by the PLMS Centre.

FIG. 29 shows in more detail the package traceability task carried out by the PLMS Centre. When a query is received about a particular product, based on data logged in a Historical Database and coming from the Filling Machine, the PLMS Centre may provide different outputs including a chart displayed in a window of the Graphical User Interface and a report including information such as temperatures, machine settings, product level, info about last pre-sterilization, last Cleaning in Place (CIP), last splice, last stop, etc.

FIGS. 30 to 34 show different schematic layouts of an integrated Packaging System according to a second embodiment of the present invention, wherein same reference numerals as those in FIG. 1 reference the same elements.

The Packaging Systems shown in FIGS. 30 to 34 differ from that shown in FIG. 1 in that they are of a so-called Multi-Switch type. In particular, unlike a so-called Multi-Line Packaging System, wherein a plurality of operatively stand-alone Packaging Lines, i.e., Packaging Lines which do not share Distribution Equipments, are provided, a Multi-Switch Packaging System includes a plurality of operatively cooperating Packaging Lines, i.e., Packaging Lines arranged to share one or more Distribution Equipments, so increasing the flexibility and the production variability for the customer.

In such a Multi-Switch Packaging System, the Recipe Manager is to be designed to identify a Filling Machine and a specific configuration of Distribution Equipments to be involved in, and the individual Equipment Recipes in the Filling Machine and in the involved Distribution Equipment(s) to be implemented for, the production of a final package unit corresponding to the selected Line Recipe.

A Multi-Switch Packaging System may include either a single-tier control architecture with a single, common Line Controller programmed to manage configuration, communication and control of all the Packaging Lines with the aim of optimizing the interaction between the Filling Machines and the Distribution Equipments to improve the Multi-Switch Packaging System performance and product transportation during production, or a two-tier control architecture with a slave Line Controller for each Packaging Line, and a master Line Controller for the slave Line Controllers. In the single-tier control architecture, the PLMS Centre is programmed to cooperate with the common Line Controller, while in the two-tier control architecture the PLMS Centre is programmed to cooperate either with the master Line Controller, or with the slave Line Controllers, or with both the master Line Controller and the slave Line Controllers.

Figure 30:
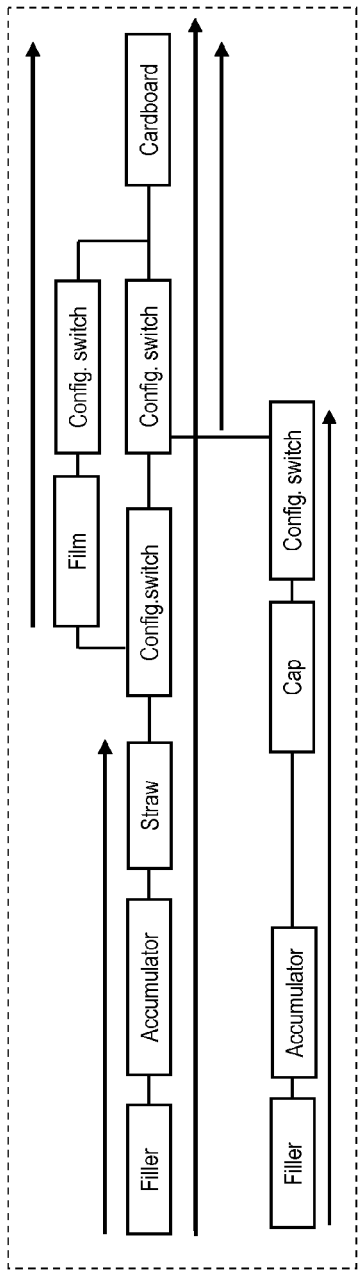
FIGS. 30 to 34 show block diagrams depicting different schematic layouts of an integrated Packaging System according to a second embodiment of the present invention.

An extensive investigation carried out by the Applicant in the food packaging field has shown that three main architectural topologies of Multi-Switch
Packaging Systems are needed to meet customers' demands, namely:
Production Differentiation: FIG. 30 shows a Multi-Switch Packaging System with a layout wherein two single Packaging Lines share a common Cardboard Packer. In particular, the first Packaging Line includes, in order, a Filling Machine, an Accumulator, a Straw Applicator, a first Configuration Switch, a first and a second branch branching off from the first Configuration Switch and merging into a Cardboard Packer, the first branch including a Film Wrapper and a second Configuration Switch, and the second branch including a third Configuration Switch. The second Packaging Line includes, in order, a Filling Machine, an Accumulator, a Cap Applicator, and a fourth Configuration Switch connected to the third Configuration Switch in the second branch of the first Packaging Line. The layout shown in FIG. 30 allows three possible Line Recipes to be simultaneously implemented, which are depicted with continuous, dashed, and dotted arrows, and in particular:
a first Line Recipe (continuous arrow), wherein the packages flow through the first Packaging Line only, and in particular, through the Filling Machine, the Accumulator, the Straw Applicator, the first Configuration Switch, the first branch, and the Cardboard Packer;
a second Line Recipe (dashed arrow), wherein the packages flow through the first Packaging Line only, and in particular, through the Filling Machine, the Accumulator, the Straw Applicator, the first Configuration Switch, the second branch, and the Cardboard Packer; and
a third Line Recipe (dotted arrow), wherein the packages produced by the Filling Machine in the second Packaging Line flow through the second Packaging Line, and, thorough the second and third Configuration Switches, are redirected to the Cardboard Packer in the first Packaging Line;

In another layout, which is not shown, two Filling Machines, configured to produce differently shaped packages, may share all of the downstream Distribution Equipments.

Figure 31:
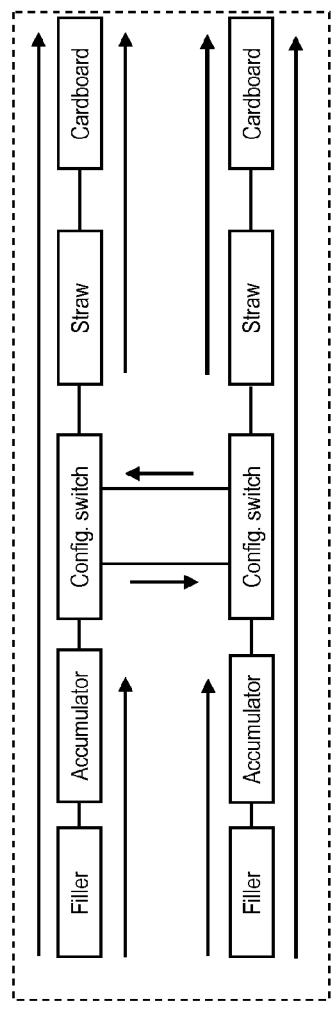
Figure 32:
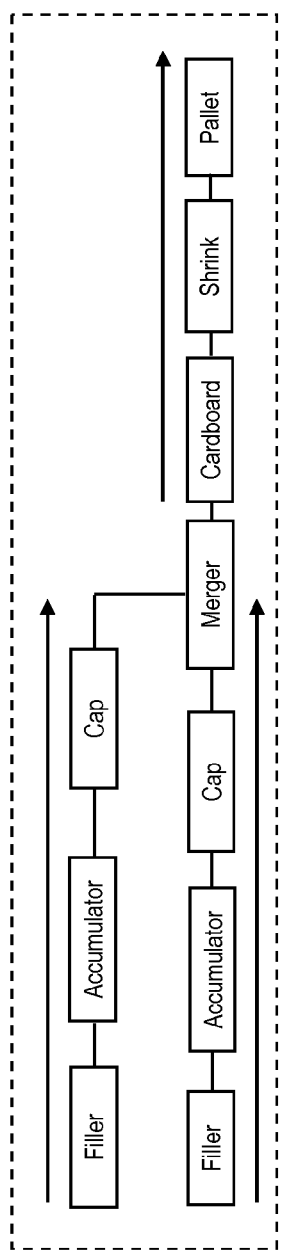
Figure 33:
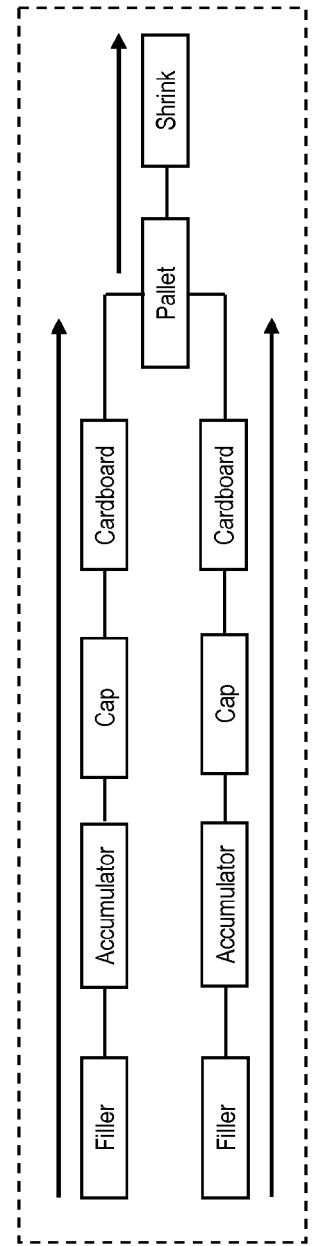

Backup: FIG. 31 shows a Multi-Switch Packaging System with a layout that allows a package flow from one Packaging Line to be redirected to the other Packaging Line, so increasing the flexibility in case of Distribution Equipment maintenance and breakdown. In particular, the Packaging System shown in FIG. 31 includes two identical single Packaging Lines, each including, in order, a Filling Machine, an Accumulator, a Configuration Switch, a Straw Applicator, and a Cardboard Packer, wherein the two Configuration Switches are mutually connected to allow the Straw Applicator and the Cardboard Packer in one Packaging Line to work on packages produced by a Filling Machine in the other Packaging Line. The layout shown in FIG. 31 allows four possible Line Recipes to be simultaneously implemented, which are depicted with continuous, dashed, and dotted arrows, and in particular:

a first Line Recipe (continuous arrows), wherein the packages flow through the first Packaging Line only;

a second Line Recipe (continuous arrows), wherein the packages flow through the second Packaging Line only;

a third Line Recipe (dashed arrow), wherein the packages produced by the Filling Machine in the first Packaging Line flow through the Accumulator in the same Packaging Line, the two mutually connected Configuration Switches, and the Straw Applicator and Cardboard Packer in the second Packaging Line; and a fourth Line Recipe (dotted arrow), wherein the packages produced by the Filling Machine in the second Packaging Line flow through the Accumulator in the same Packaging Line, the two mutually connected Configuration Switches, and the Straw Applicator and Cardboard Packer in the first Packaging Line;

Flow Merge: FIGS. 32 and 33 show a Multi-Switch Packaging System with a layout that allows two package flows to be merged into one, so reducing the number of Distribution Equipments involved in the production. In particular, in the Multi-Switch Packaging System shown in FIG. 32, a common Palletizer is shared between two Packaging Lines, wherein the first Packaging Line includes a Filling Machine, an Accumulator, and a Cap Applicator, and the second Packaging Line includes a Filling Machine, an Accumulator, a Cap Applicator, a Merger, a Cardboard Packer, a Cardboard Tray Wrapper, and a Palletizer. In the Multi-Switch Packaging System shown in FIG. 33, a common Palletizer and a common Film Wrapper are shared between two identical Packaging Lines, each including a Filling Machine, an Accumulator, a Cap Applicator, and a Cardboard Packer. In another layout, which is not shown, the Packaging Lines share a common Film Wrapper, and each includes a Filling Machine, an Accumulator, a Straw Applicator, a Film Wrapper, and a Cardboard Packer. In these Packaging Systems the two Packaging Lines may be operated simultaneously or one at a time, with different production capacities.

Figure 34:
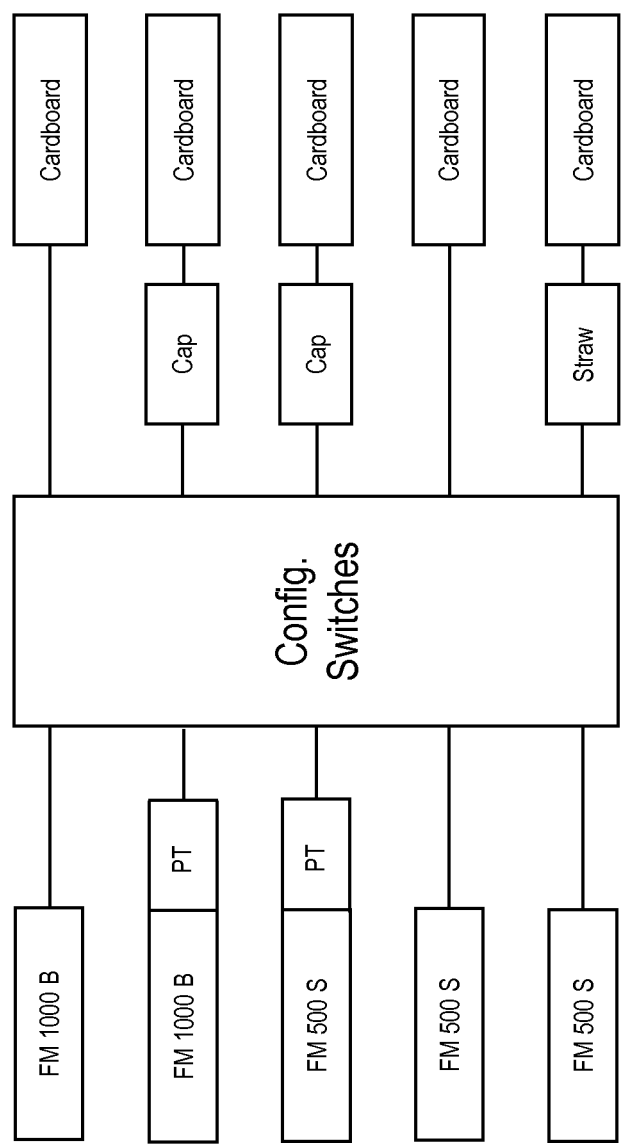

In the end, FIG. 34 shows a Multi-Switch Packaging System embodying two of the aforementioned Multi-Switch layouts, namely the Backup layout and the Production Differentiation layout. In particular, the Packaging System shown in FIG. 34 includes several Packaging Lines with Filling Machines which are configured to produce differently shaped packages, and two of which are also equipped with Pull-Tab Systems. Two Packaging Lines additionally include Cardboard Packers only, two Packaging Lines additionally include Cap Applicators and Cardboard Packers, and one Packaging Line additionally includes a Straw Applicator and a Cardboard Packer. In the end, all the Filling Machines share all the afore-mentioned downstream Distribution Equipments.

Finally, it is clear that numerous modifications and variants can be made to the present invention, all falling within the scope of the invention, as defined in the appended claims,

The invention claimed is:

1. A packaging system comprising:

a packaging line comprised of a filling machine and one or more downstream distribution equipments connected via conveyors; the filling machine being operable to produce one or more types of sealed packages containing a food product, and each distribution equipment being operable to carry out a corresponding operation on individual or groups of the sealed packages; the filling machine and each distribution equipment including an electronic control system which stores and executes one or more software modules;

a line controller which manages configuration, communication and control of the packaging line, and including a display, a keyboard, and a processing system which stores and executes one or more software applications configured to cooperate with the software modules in the filling machine and each distribution equipment;

a communication network connecting the line controller to the filling machine and each distribution equipment;

the filling machine and each distribution equipment being configured to implement one or more selectable, stored equipment recipes, wherein an equipment recipe for the filling machine defines the type of sealed packages to be produced by the filling machine, and an equipment recipe for the distribution equipment defines operation(s) to be carried out by the distribution equipment;

the line controller being configured to store and implement one or more selectable line recipes, each of which defines a corresponding final package unit to be produced by the packaging line, and causes, when implemented, the filling machine and the distribution equipment(s) involved in the production of the final package to implement corresponding equipment recipes;

the one or more selectable line recipes specifying:
the filling machine, distribution equipments and conveyors to be involved in producing the final package unit;
the equipment recipes to be implemented by the filling machine and the involved distribution equipments for producing the final package unit; and
line automation parameters to be used by the filling machine and the involved distribution equipments and conveyors for the production of the final package unit; and the software applications in the line controller comprise:
a recipe manager which automatically configures the packaging line to implement a selected line recipe by:
instructing the filling machine and the distribution equipment specified in the selected line recipe about the equipment recipes specified in the selected line recipe that are to be implemented to produce the final package unit; and downloading the line automation parameters contained in the selected Line recipe to the filling machine and the distribution equipment specified in the selected line recipe.

2. The packaging system of claim 1, wherein the recipe manager is further configured to allow a line recipe to be created and stored, and the stored line recipe to be selected for implementation, via a graphical user interface.

3. The packaging system of claim 1, wherein the recipe manager is further configured to perform at least one of:
production interlocking, to reduce human dependency in controlling key production parameter;
equipment interlocking, to prevent mismatches between line and equipment recipes;
layout interlocking to prevent mismatches in the packaging line layout configuration;
production material interlocking, to prevent mismatches between the type of material used in the filling machine and distribution equipment(s) and a type of material defined in the selected line recipe; and
data handler, to automatically provide a packaging line monitoring system with factory floor data related to the selected line recipe.

4. The packaging system of claim 1, wherein one of the equipment recipes specifies:
recipe definition parameters, which are indicative of characteristics of a type of sealed package or package unit to be produced, or an operation to be carried out; and
recipe-dependent operating parameters which are specific for the type of sealed package, package unit or operation(s) defined by the recipe definition parameters.

5. The packaging system of claim 1, wherein the software applications in the line controller further include:
a line commander configured to start/stop the filling machine and the distribution equipment(s) involved in the production according to a start/stop policy, and to dynamically regulate production capacities and operating parameters of the filling machine and the involved distribution equipment(s) according to a flow control policy during production;
the start/stop policy defines a start/stop sequence and delays of the filling machine and the distribution equipment(s) after a start/stop of any of the filling machine and the distribution equipment(s), so as to prevent package queues from forming, with a length higher than a given value, at inlet(s) of the involved distribution equipment(s) during a start/stop transitional phase of the production; and
the flow control policy defining an operating speed of the conveyors and production capacities of the filling machine and the involved distribution equipment(s) to allow a substantially constant distance to be achieved between packages or package units, so as to prevent them from crashing and package queues from forming, with a length higher than a given value, at the inlet(s) of the involved distribution equipment(s) during operation.

6. The packaging system of claim 5, wherein the line commander is further configured to start warming up the filling machine and the involved distribution equipment(s) according to an energy saving policy which is intended to prevent a complete warm-up of the filling machine or an involved distribution equipment while other equipment in the packaging line are still warming up.

7. The packaging system of claim 6, wherein the Line Commander is further configured to allow warm-up start times to be set for the filling machine and each involved distribution equipment based on the ambient operating conditions.

8. The packaging system of claim 5, wherein the line commander is further configured to monitor and provide visual information on operation of the filling machine and the involved distribution equipment(s).

9. The packaging system of claim 8, further comprising a common overhead message display, and wherein the line commander is configured to provide a basic visual information via the common overhead message display, and a detailed visual information via the line controller display.

10. The packaging system of claim 5, wherein the line automation parameters in one of the line recipes include the operating parameters of the start/stop policy and the operating parameters of the flow control policy.

11. The packaging system of claim 1, wherein the software applications in the line controller further include:
a line configurator configured to provide configuration functionalities selectable/implementable via a graphical user interface, the configuration functionalities including:
automatic detection and identification of the filling machine, distribution equipment(s) and conveyor(s) in the packaging line, and automatic upload of the production/operating capabilities of the filling machine, distribution equipment(s) and conveyor(s) in the packaging line;
graphical drawing of a packaging line layout including graphical representations of filling machine, distribution equipment(s), and conveyor(s);
association of the graphical representations of the filling machine, distribution equipment(s), and conveyor(s), with the identified filling machine, distribution equipment(s), and conveyor(s); and
setting of the production/operating parameters of the identified filling machine, distribution equipment(s), and conveyor(s) in the packaging line, and of general automation parameters of the packaging line.

12. The packaging system of claim 11, wherein the configuration functionality related to the automatic detection and identification of the filling machine, distribution equipment(s) and conveyor(s), and automatic upload of the production/operating capabilities of the filling machine, distribution equipment(s) and conveyor(s) includes:
dispatching identification requests to the filling machine and the distribution equipment(s);
receiving identification data from the filling machine and the distribution equipment(s);
dispatching data requests to the identified filling machine and the distribution equipment(s) for production-related data including production capacities of the identified filling machine and the distribution equipment(s) and
receiving production data information from the identified filling machine and the distribution equipment(s).

13. The packaging system of claim 11, wherein in the functionality related to the graphical drawing of the packaging line layout, the graphical user interface is configured to provide a display area divided into a plurality of display pixels, in each of which graphical representations of a selected filling machine, distribution equipment, or conveyor are displayable, with selection of the filling machine, distribution equipment and conveyor being performed by clicking on a portion of the display.

14. The packaging system of claim 11, wherein the functionality related to the association of the graphical representations of the filling machine, distribution equipment(s), and conveyor(s), with identified filling machine, distribution equipment(s), and conveyor(s) includes an association check to prevent any misassociation.

15. The packaging system of claim 1, wherein the software applications in the line controller further include:
- a conveyor optimizer configured to provide optimization functionalities selectable/implementable via a graphical user Interface, the optimization functionalities including:
  - setting of operating parameters of each conveyor in the packaging line; and
  - operation of a conveyor lubricating and cleaning unit.

16. The packaging system of claim 1, further including a plurality of operatively-cooperating packaging lines arranged to share one or more distribution equipments to achieve one or more of the following production purposes:
- production differentiation in which the distribution equipments are shared to simultaneously implement different line recipes;
- backup in which the distribution equipments are shared to redirect a package flow from one packaging line to another to allow maintenance or breakdown management of a distribution equipment; and
- flow merge in which the distribution equipments are shared to merge two package flows into one to reduce the number of distribution equipments involved in the production.

17. The packaging system of claim 16, wherein the line controller is common to all the packaging lines.

18. The packaging system of claim 16, including a slave line controller for each packaging line, and a master line controller coupled to the slave line controllers.

19. The packaging system of claim 1, further including:
- a packaging line monitoring system configured to cooperate with the line controller to monitor the operational performance of the filling machine and the distribution equipment(s) involved in the production to allow real-time and/or historical performance analysis.

20. The packaging system of claim 19, wherein the packaging line monitoring system is further configured to provide product traceability and process monitoring functionalities implementable via a graphical user interface, based on data logged in a historical database.

21. The packaging system of claim 20, wherein the product traceability functionality includes a graphical operator sheet where data can be entered on operator's demand or automatically requested based on equipment events, and of a graphical operator sheet report based on data logged at the filling machine, which operator sheet report allows monitoring of process parameters and critical control points during production.

22. The packaging system of claim 20, wherein the product traceability functionality further includes time synchronization of the data logging time to a central time synchronization system.

23. The packaging system of claim 1, wherein the filling machine is operable to selectively produce one or different type of sealed packages containing one or different food products.

* * * * *